(12) United States Patent
Sang et al.

(10) Patent No.: US 11,324,368 B2
(45) Date of Patent: *May 10, 2022

(54) DUST COLLECTOR AND FILTERING ASSEMBLY

(71) Applicant: SUZHOU ALTON ELECTRICAL & MECHANICAL INDUSTRY CO., LTD., Jiangsu (CN)

(72) Inventors: Shuhua Sang, Jiangsu (CN); Yuangang Gao, Jiangsu (CN)

(73) Assignee: Suzhou Alton Electrical & Mechanical Industry Co., Ltd., Jiangsu (CN)

(*) Notice: Subject to any disclaimer, the term of this patent is extended or adjusted under 35 U.S.C. 154(b) by 286 days.

This patent is subject to a terminal disclaimer.

(21) Appl. No.: 16/497,769

(22) PCT Filed: Apr. 10, 2018

(86) PCT No.: PCT/CN2018/082570
§ 371 (c)(1),
(2) Date: Sep. 25, 2019

(87) PCT Pub. No.: WO2018/188597
PCT Pub. Date: Oct. 18, 2018

(65) Prior Publication Data
US 2021/0100415 A1 Apr. 8, 2021

(30) Foreign Application Priority Data
Apr. 11, 2017 (CN) .......................... 201710233246.7

(51) Int. Cl.
B01D 46/00 (2022.01)
B01D 46/24 (2006.01)
(Continued)

(52) U.S. Cl.
CPC ............. *A47L 9/127* (2013.01); *A47L 7/0004* (2013.01); *A47L 7/0028* (2013.01);
(Continued)

(58) Field of Classification Search
CPC .............. B01D 46/0005; B01D 46/521; B01D 46/2414; B01D 46/0068; B01D 35/30;
(Continued)

(56) References Cited

U.S. PATENT DOCUMENTS 3,546,853 A * 12/1970 Claar ................... B60K 15/035
55/419
3,957,639 A * 5/1976 Schoen .............. B01D 46/0068
210/107

(Continued)

FOREIGN PATENT DOCUMENTS

CN 203328636 U 12/2013
CN 104934740 A 9/2015
(Continued)

OTHER PUBLICATIONS

International Search Report for Application No. PCT/CN2018/082570, dated Jul. 9, 2018, 6 pages.

*Primary Examiner* — Minh Chau T Pham
(74) *Attorney, Agent, or Firm* — Morgan, Lewis & Bockius LLP

(57) ABSTRACT

A dust collector includes a filter frame, a cartridge filter, an end cap, and a cover. The filter frame is provided with a center column. The end cap is provided with a bottom plate, a plurality of sliding slots, a plurality of first side walls, a plurality of baffles extending from the first side walls, and a plurality of clamping members. The cover is provided with a plurality of protruding members and a plurality of extending members. The filter frame includes an accommodating space. The bottom plate is provided with a plurality of
(Continued)

through openings that run through the bottom plate. The through openings are disposed opposite to the baffles and are configured to communicate between the sliding slots and the accommodating space. The extending members extend into the through openings. The first side walls are connected between the bottom plate and the baffles.

20 Claims, 16 Drawing Sheets

(51) Int. Cl.
*B01D 46/48* (2006.01)
*B01D 46/52* (2006.01)
*A47L 9/10* (2006.01)
*A47L 9/12* (2006.01)
*A47L 7/00* (2006.01)

(52) U.S. Cl.
CPC ..... *B01D 46/0004* (2013.01); *B01D 46/2414* (2013.01); *B01D 46/48* (2013.01); *B01D 46/521* (2013.01); *B01D 2265/028* (2013.01); *B01D 2265/029* (2013.01); *B01D 2279/55* (2013.01)

(58) Field of Classification Search
CPC .............. B01D 27/08; B01D 2265/025; B01D 2279/55; A47L 5/365; A47L 9/00; A47L 9/102; A47L 9/127; F02M 35/0203

USPC .................. 55/385.3, 498, 502; 123/198 E
See application file for complete search history.

(56) References Cited

U.S. PATENT DOCUMENTS

| | | | | |
|---|---|---|---|---|
| 4,948,505 | A * | 8/1990 | Petrucci | B01D 35/30 210/238 |
| 5,076,918 | A * | 12/1991 | Foust | B01D 27/106 210/238 |
| 5,783,086 | A | 7/1998 | Scanlon et al. | |
| 5,865,863 | A * | 2/1999 | DeSousa | F02M 35/1261 55/385.3 |
| 10,239,010 | B2 * | 3/2019 | Sang | A47L 5/365 |
| 11,089,928 | B2 * | 8/2021 | Sang | A47L 9/127 |
| 2007/0113529 | A1 | 5/2007 | Gierer | |
| 2012/0222242 | A1 | 9/2012 | Conrad | |

FOREIGN PATENT DOCUMENTS

| | | |
|---|---|---|
| CN | 106361223 A | 2/2017 |
| CN | 106377205 A | 2/2017 |
| CN | 106388705 A | 2/2017 |
| CN | 106510549 A | 3/2017 |
| CN | 106859499 A | 6/2017 |
| CN | 107049142 A | 8/2017 |
| CN | 206546489 U | 10/2017 |
| CN | 207270312 U | 4/2018 |
| JP | 2003054613 A | 2/2003 |

* cited by examiner

DUST COLLECTOR AND FILTERING ASSEMBLY

CROSS REFERENCE TO RELATED APPLICATIONS

This application is a United States national phase application of co-pending international patent application number PCT/CN2018/082570, filed on Apr. 10, 2018, which claims the priority to China patent application No. 201710233246.7, filed on Apr. 11, 2017, disclosures of both of which are incorporated herein by reference in their entireties.

TECHNICAL FIELD

The present disclosure relates to a dust collector, and more particularly relates to a filtering device of the dust collector.

BACKGROUND

A dust collector is a commonly used household cleaning device. Patent publication number CN 203328636 discloses a dust collector, in which an end cap disposed at an end of a cartridge filter of the dust collector is provided with an end hole running through the end cap. A center column on the filter frame passes through the end hole, and a fixing button is screwed and locked on the end cap. A plurality of claws that are integrally formed with the fixing button extend from the fixing button, and as the fixing button is screwed on the end cap, the claws on the fixing button clasp the center column. However, in this solution the force acted upon center column is insufficient such that the center column is easy to move up and down thereby breaking loose relative to the claws.

SUMMARY

The present disclosure provides a dust collector in which a center column of the filter frame of the dust collector can be firmly locked. The dust collector includes filter frame, a cartridge filter sleeved outside the filter frame, an end cap connected to the cartridge filter, and a cover rotatably maintained at the end cap. The filter frame is provided with a center column, and the cover is operative to rotate around the center column along and against a rotating direction. The end cap is provided with a bottom plate, a plurality of sliding slots, a plurality of first side walls, a plurality of baffles extending from the first side walls, and a plurality of clamping members. The cover is provided with a plurality of protruding members and a plurality of extending members, where the protruding members are operative to rotate along with the cover along the sliding slots. The baffles are configured to stop at one side of the protruding members to prevent the cover from separating from the end cap. The cartridge filter includes an accommodating space for accommodating the filter frame. The bottom plate is provided with a plurality of through openings running through the bottom plate, and the through openings are opposite to the baffles and are configured to communicate between the corresponding sliding slots and the accommodating space. The extending members extend into the through openings, the bottom plate and the baffles are spaced, the first side walls are connected between the bottom plate and the baffles, the clamping members respectively extend out from the first side walls and are provided with ribs, and an outer peripheral surface of the center column is provided with a thread. As cover is rotating along the rotating direction relative to the end cap, the cover is operative to push the plurality of clamping members to move towards the center column, allowing the clamping members to clamp the center column and the ribs to be embedded into the thread of the center column.

According to the present disclosure, after the center column is locked by the clamping member, a rib embedded in a thread of the center column inhibits the center column from breaking loose, which is beneficial for the center column to be stably locked by the clamping member.

The present disclosure further provides a dust collector, including a filter frame, a cartridge filter sleeved outside the filter frame, an end cap connected to the cartridge filter, and a cover fitted onto the end cap. The filter frame is provided with a center column, and the cover is operative to rotate around the center column along and against a rotating direction. The cover is rotatably maintained on the end cap, an outer peripheral surface of the center column is provided with a thread, the end cap is provided with a plurality of clamping members, and the clamping members are provided with ribs. As the cover is rotating along the rotating direction relative to the end cap, the cover is operative to push the plurality of clamping members to move towards the center column, allowing the plurality of clamping members to clamp up the center column and the ribs to be embedded into the thread of the center column.

The present disclosure further provides a dust collector, including a filter frame, a cartridge filter sleeved outside the filter frame, an end cap connected to the cartridge filter, and a rotatable cover maintained at the end cap. The end cap is provided with a sliding slot, a baffle, and a bottom plate spaced from the baffle. The cover is provided with a protruding member that is operative to rotate with the cover along the sliding slot, the baffle is configured to abut on a side of the protruding member to prevent the cover from separating from the end cap. The cartridge filter includes an accommodating space for accommodating the filter frame. The bottom plate is provided with a through opening running through the bottom plate and disposed opposite to the baffle, and the through opening communicates between the sliding slot and the accommodating space. The cover is further provided with an extending member extending into the through opening, and the extending member is operative to rotate with the cover and is limited to rotate between two opposite ends of the through opening as the cover is rotating relative to the end cap. By adopting such a design, because the extending member is limited to rotate between two opposite ends of the through opening, a range of movement of the cover relative to the end cap is limited, facilitating suppression of radial deviation or over-rotation of the cover relative to the end cap.

The present disclosure further provides a filtering assembly applied to a dust collector. The filtering assembly includes a hollow cartridge filter, an end cap connected to and blocking an end of the cartridge filter, an end ring connected to another end of the cartridge filter, and a cover rotatably maintained at an outer side of the end cap. The end cap is provided with a through end hole, the cover is operative to rotate around a center column along and against a rotating direction, and the cover blocks the end hole. The end cap is provided with a sliding slot, a clamping member, and a bottom plate. The cover is operative to push the clamping member to move towards a rotational axis of the cover as the cover is rotating relative to the end cap along the rotating direction, and the cover is provided with a protruding member that is operative to rotate with the cover along the sliding slot. The bottom plate is provided with a through opening running through the bottom plate, and the through opening communicates between the sliding slot and an inner space of the cartridge filter. The cover is further provided with an extending member extending into the through opening, the through opening includes a first end and a second end that are opposite along the rotating direction, and the extending member is limited to rotate between the first end and the second end as the cover is rotating relative to the end cap.

These features and advantages of the present disclosure will be disclosed in detail in the following embodiment and drawings.

DETAILED DESCRIPTION

Figure 1:
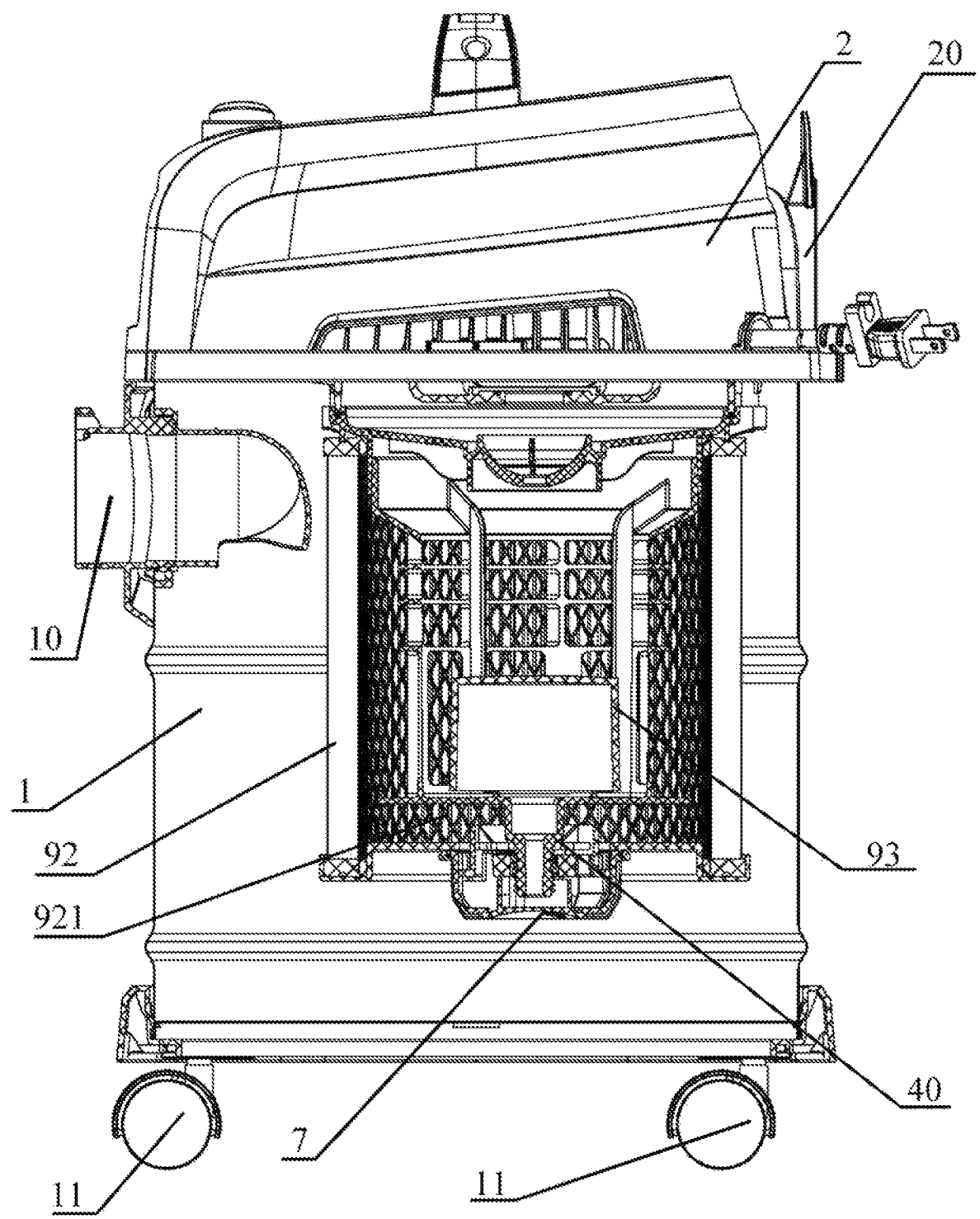
FIG. 1 is a partial cross-sectional view illustrating a dust collector in accordance with the present disclosure.
Figure 2:
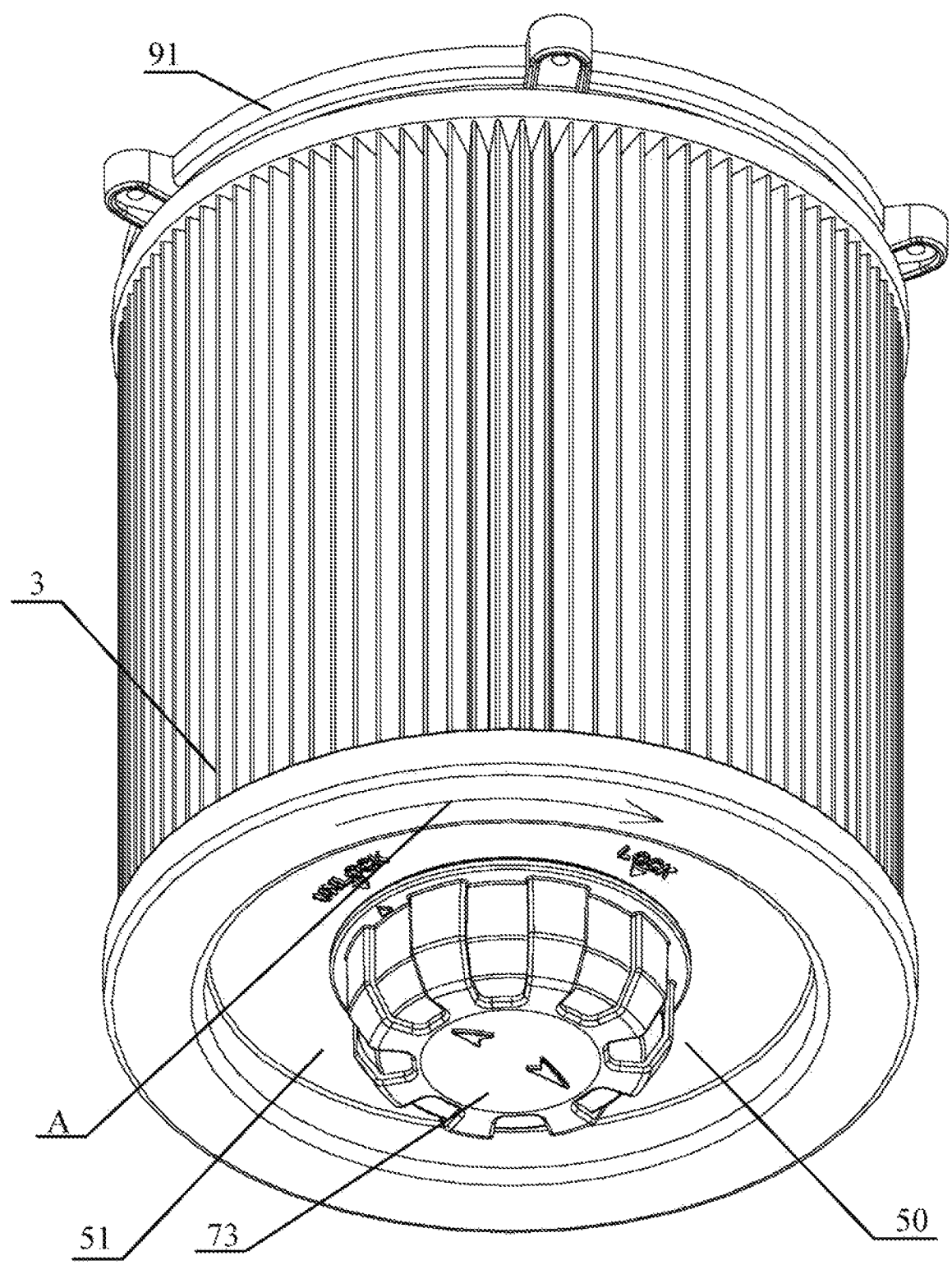
FIG. 2 is a perspective view of a filtering device and a tray of a dust collector in accordance with the present disclosure.
Figure 3:
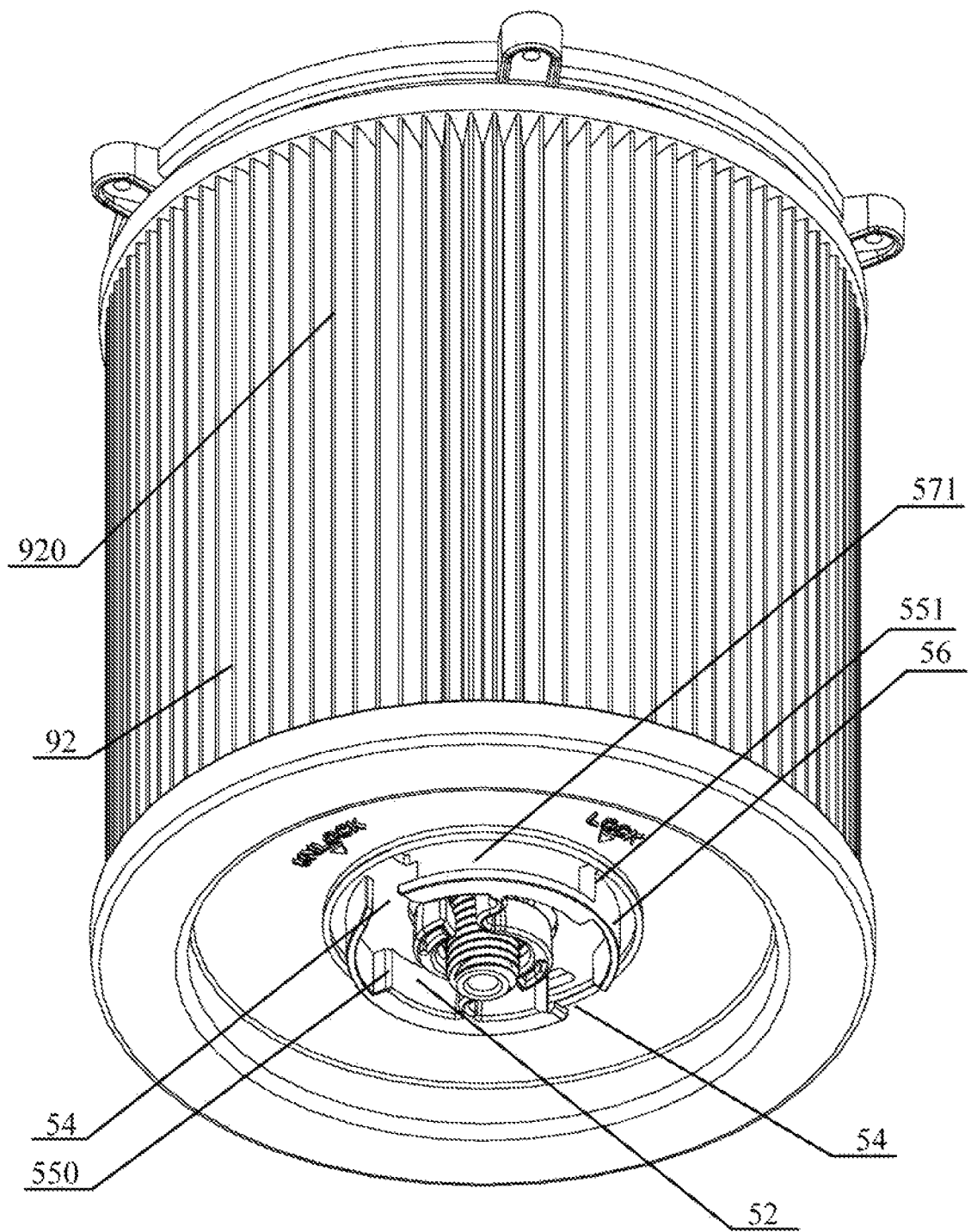
FIG. 3 is a perspective view of FIG. 2 with a cover removed.
Figure 4:
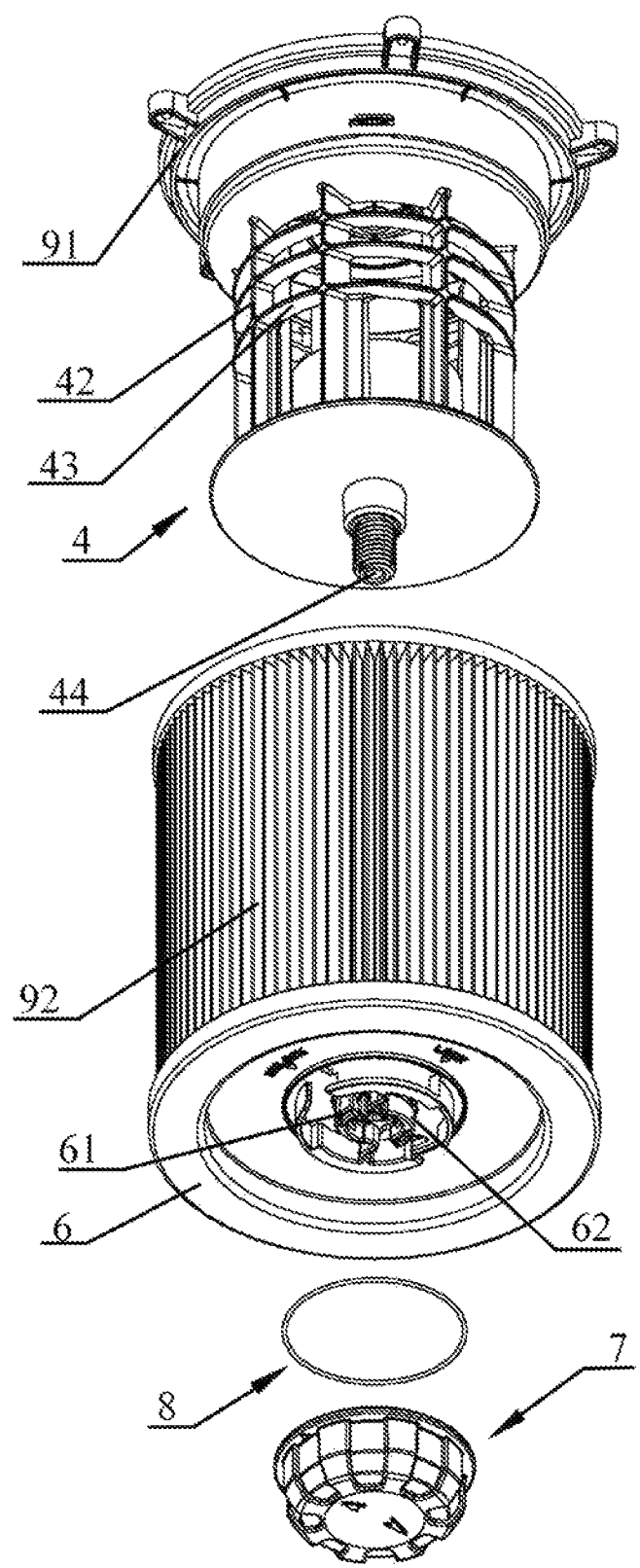
FIG. 4 is an exploded view of a filtering device and a tray.
Figure 5:
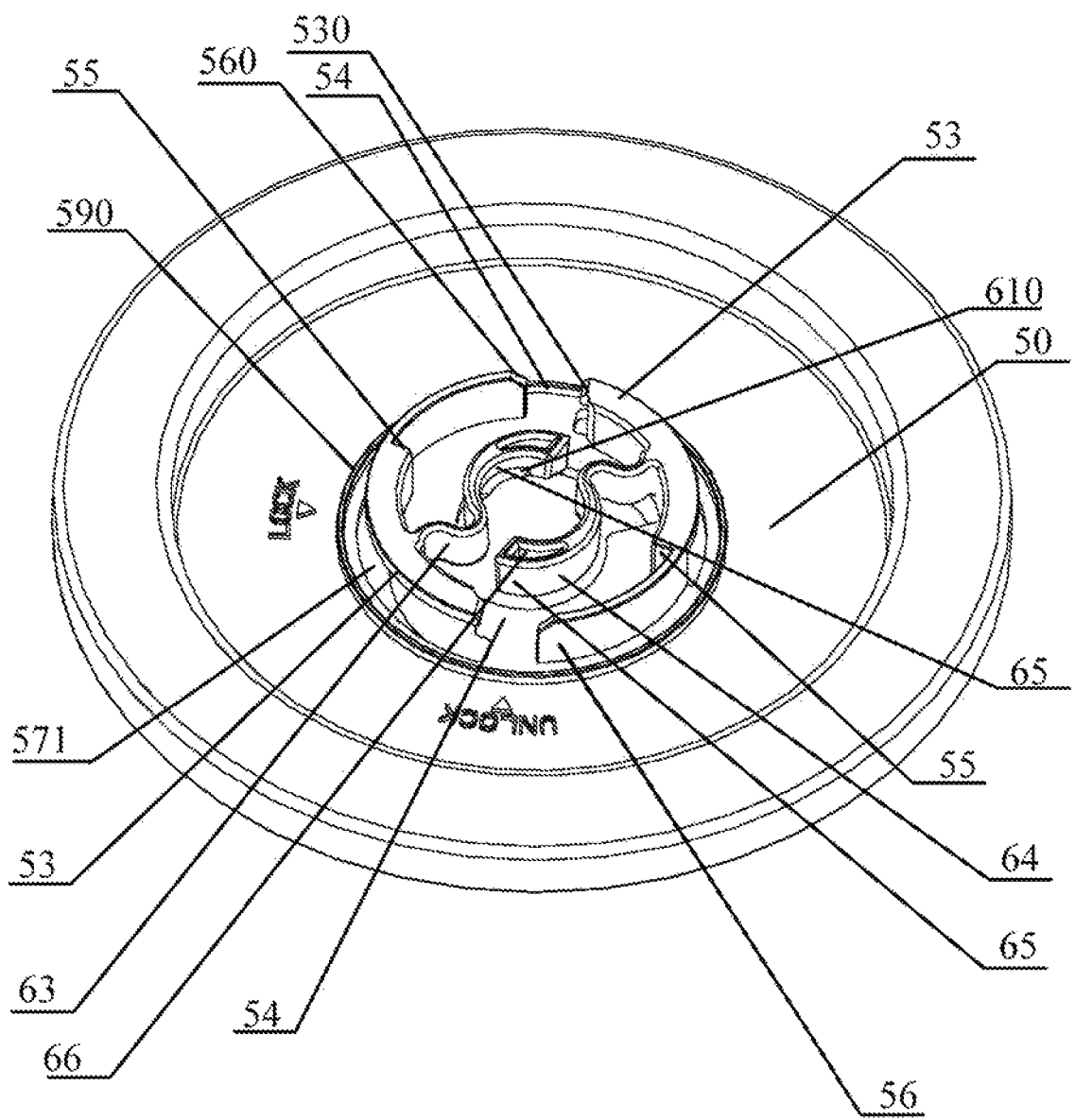
FIG. 5 is a perspective view of an end cap observed from a viewing angle.
Figure 6:
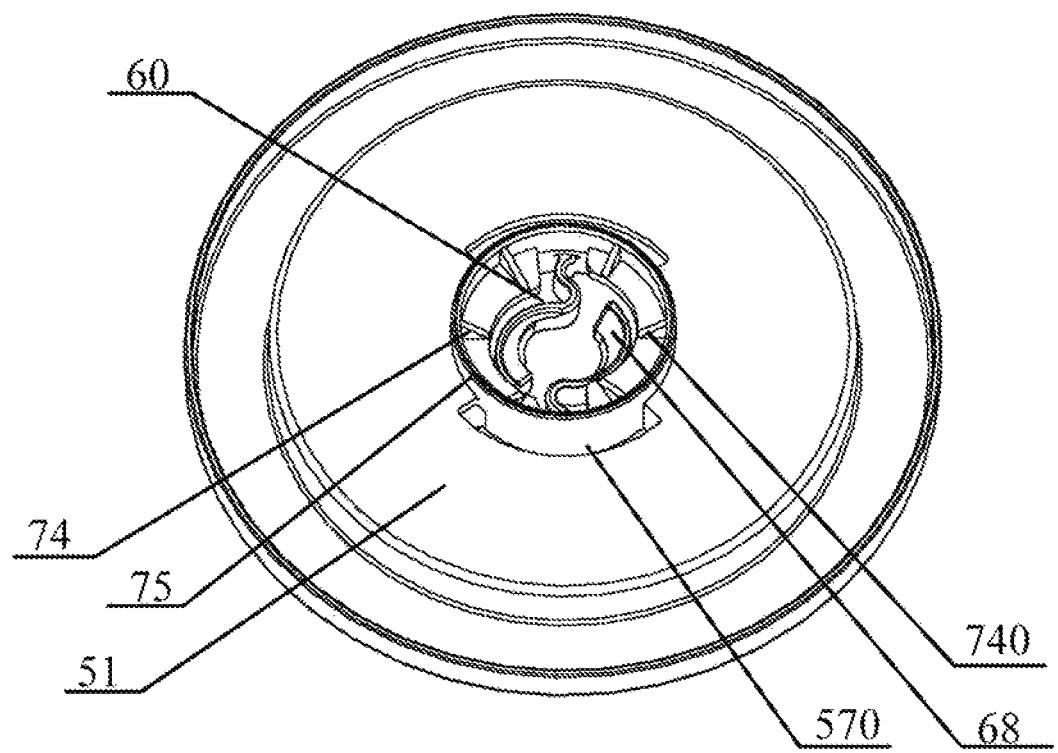
FIG. 6 is a perspective view of the end cap observed from another viewing angle.
Figure 7:
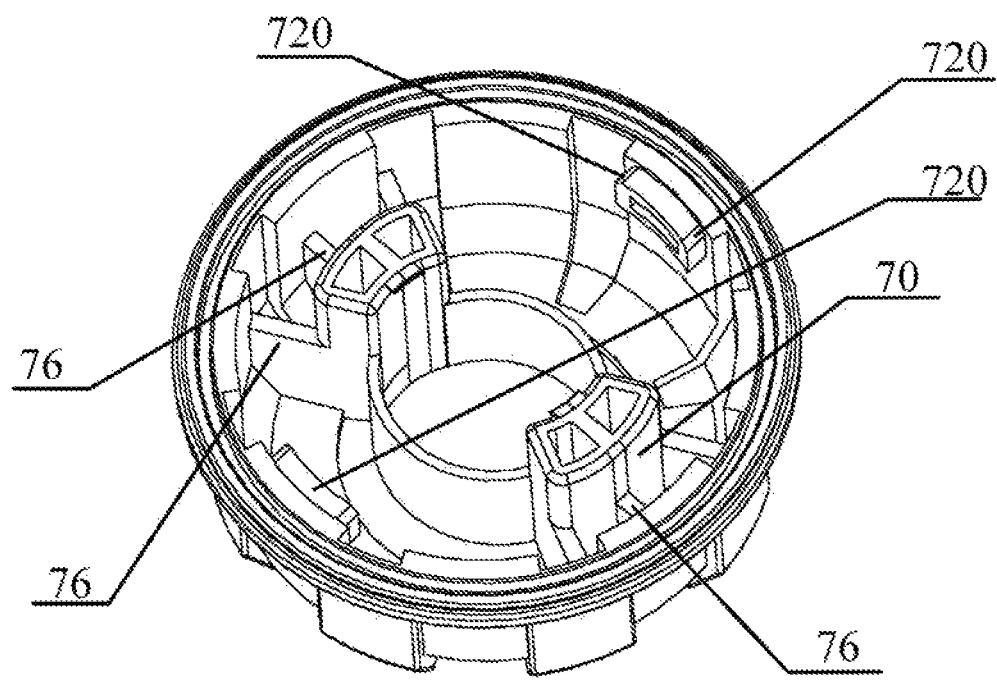
FIG. 7 is a perspective view of a cover observed from a viewing angle.
Figure 8:
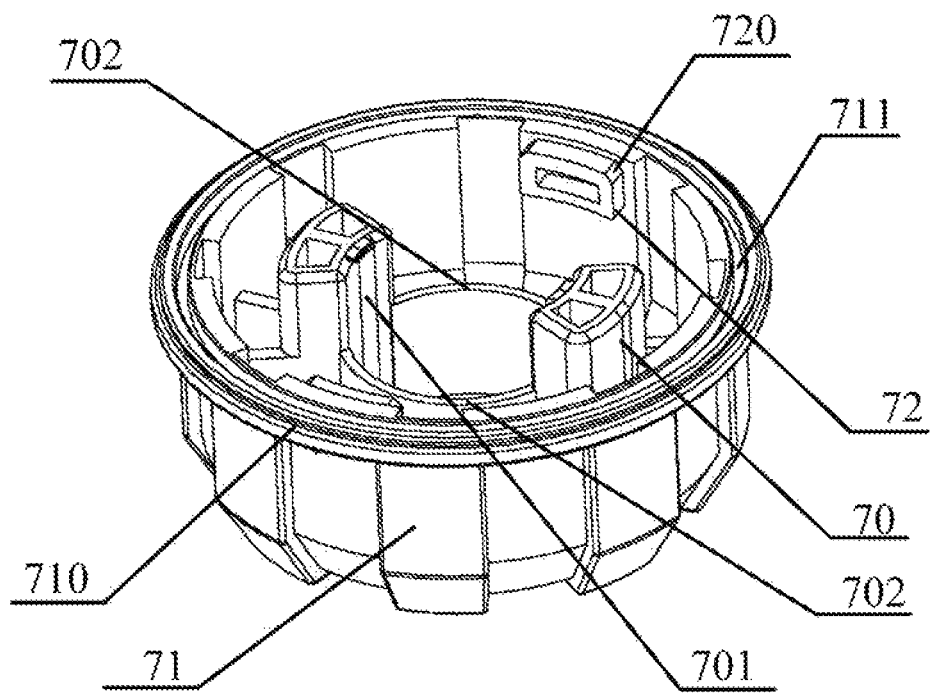
FIG. 8 is a perspective view of the cover observed from another viewing angle.
Figure 9:
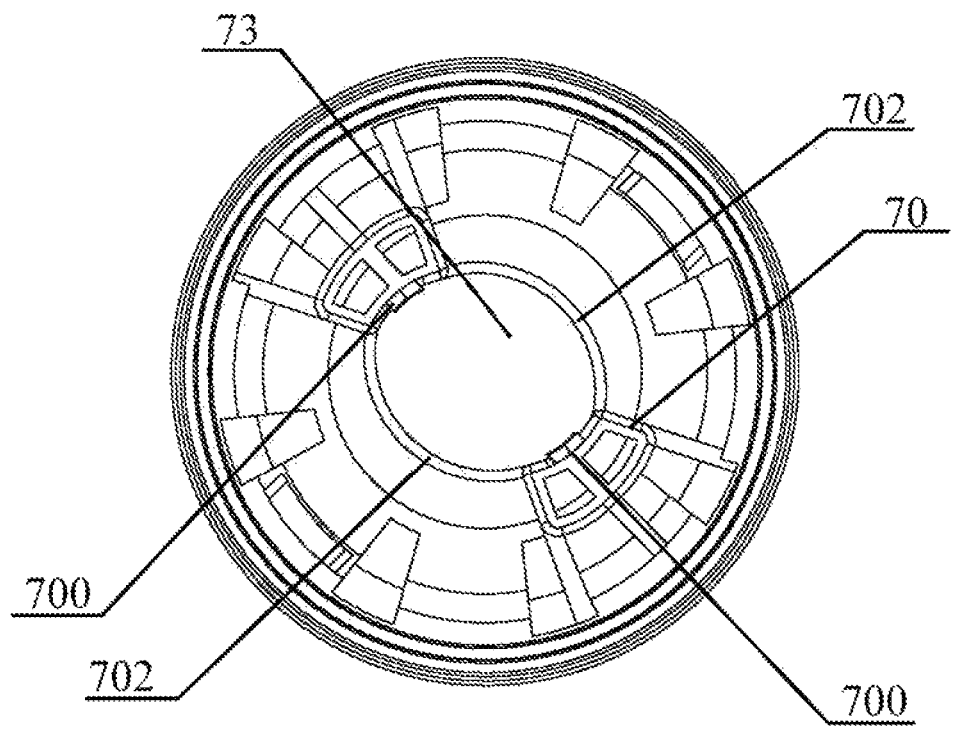
FIG. 9 is a top view of the cover.
Figure 10:
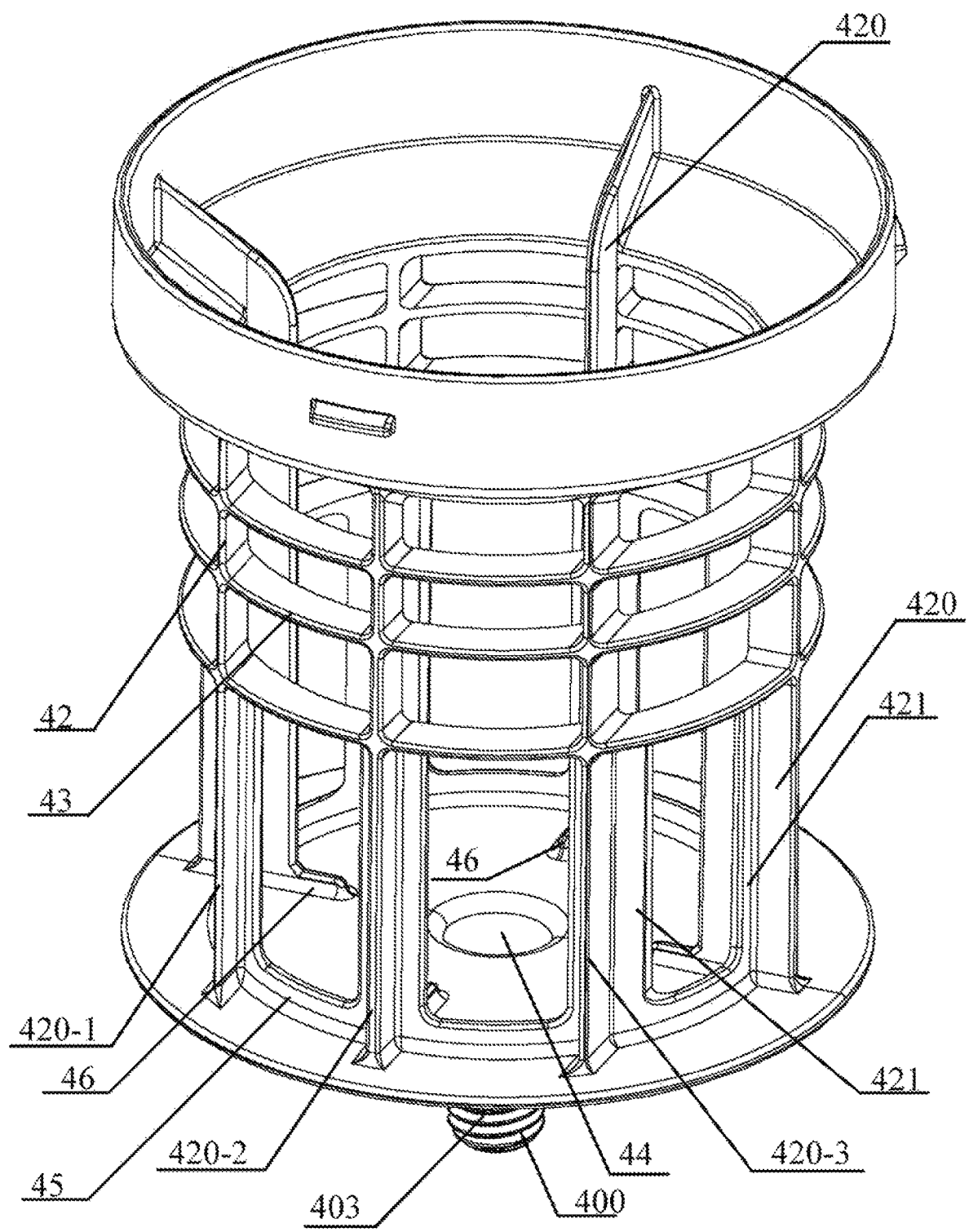
FIG. 10 is a perspective view of a filter frame.
Figure 11:
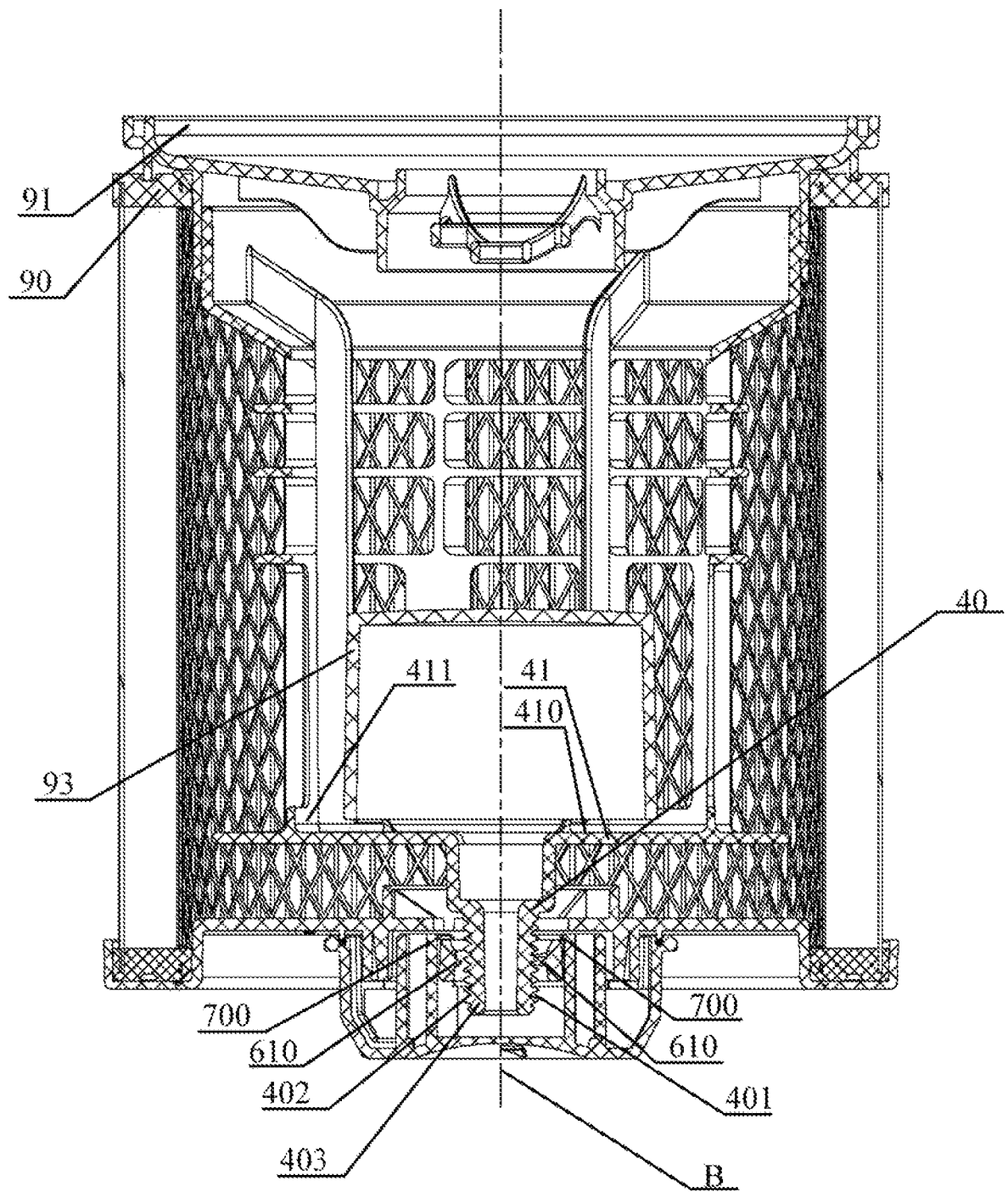
FIG. 11 is a longitudinal cross-sectional view at an angle of the filtering device and the tray (where the cross-section is parallel to an axis B and the center column is not clamped)
Figure 12:
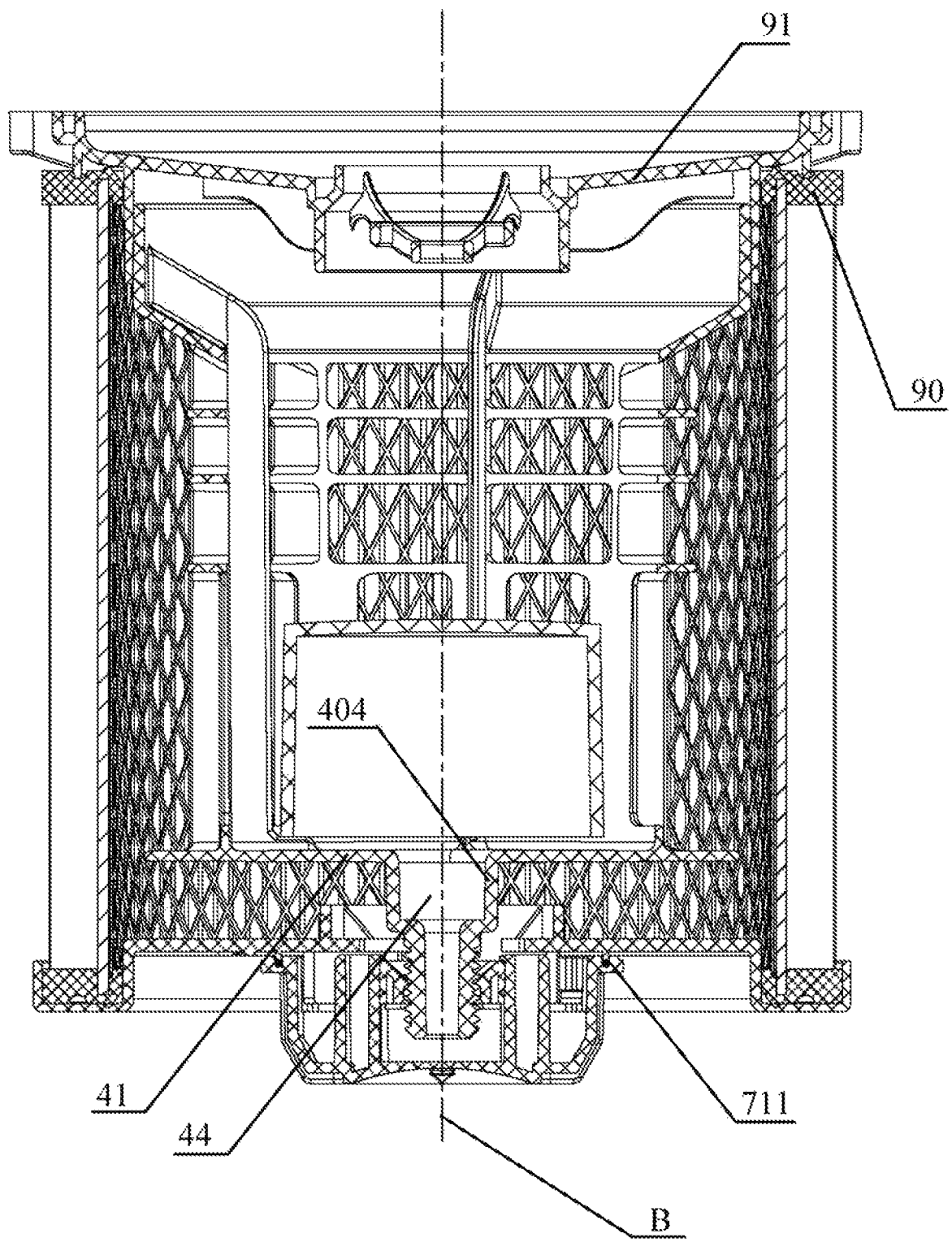
FIG. 12 is a longitudinal cross-sectional view at another angle of the filtering device with the tray (where the cross-section is parallel to the axis B and the center column is clamped)
Figure 13:
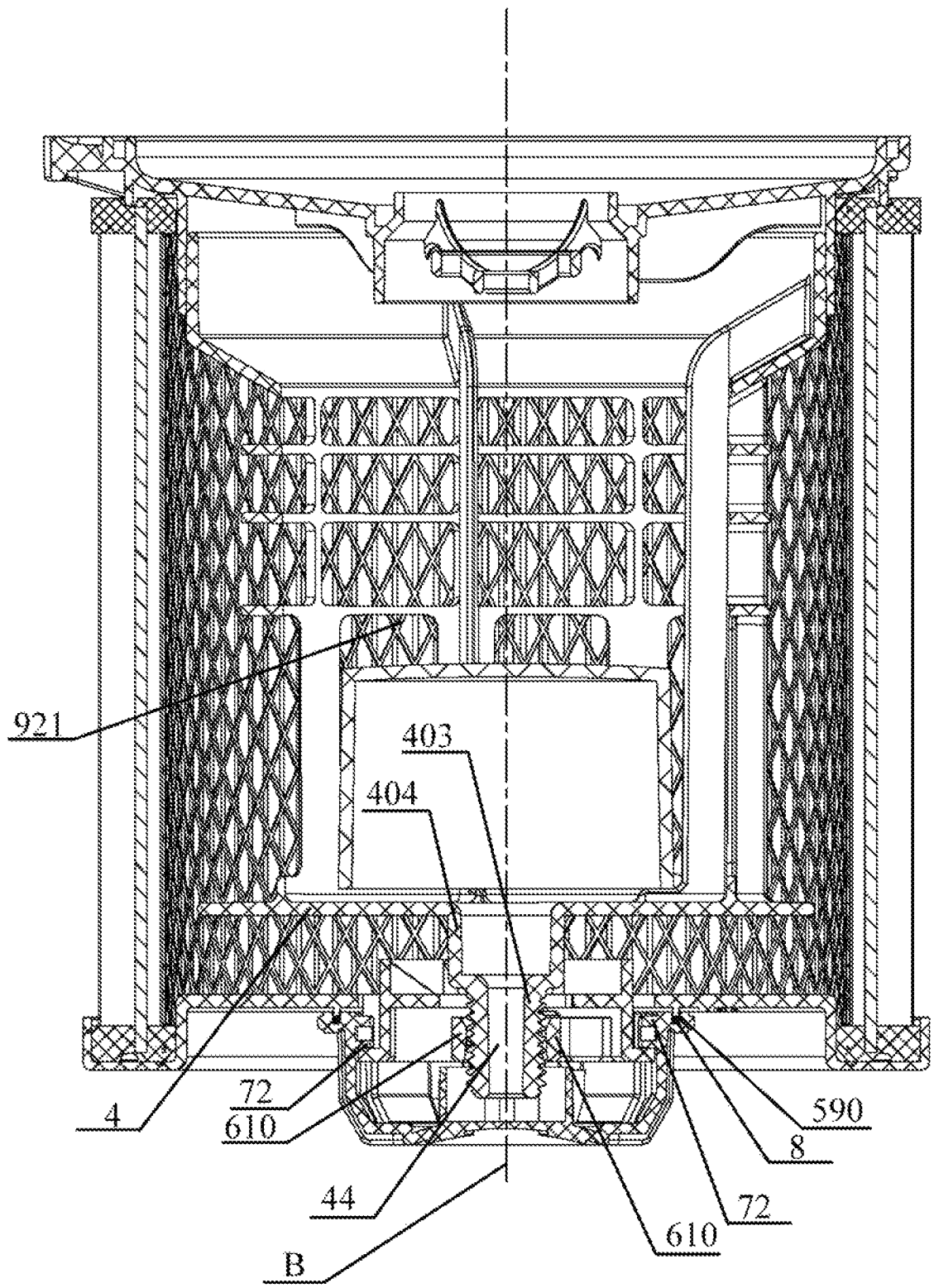
FIG. 13 is a longitudinal cross-sectional view at yet another angle of the filtering device with the tray (where the cross-section is parallel to the axis B and the center column is clamped)
Figure 14:
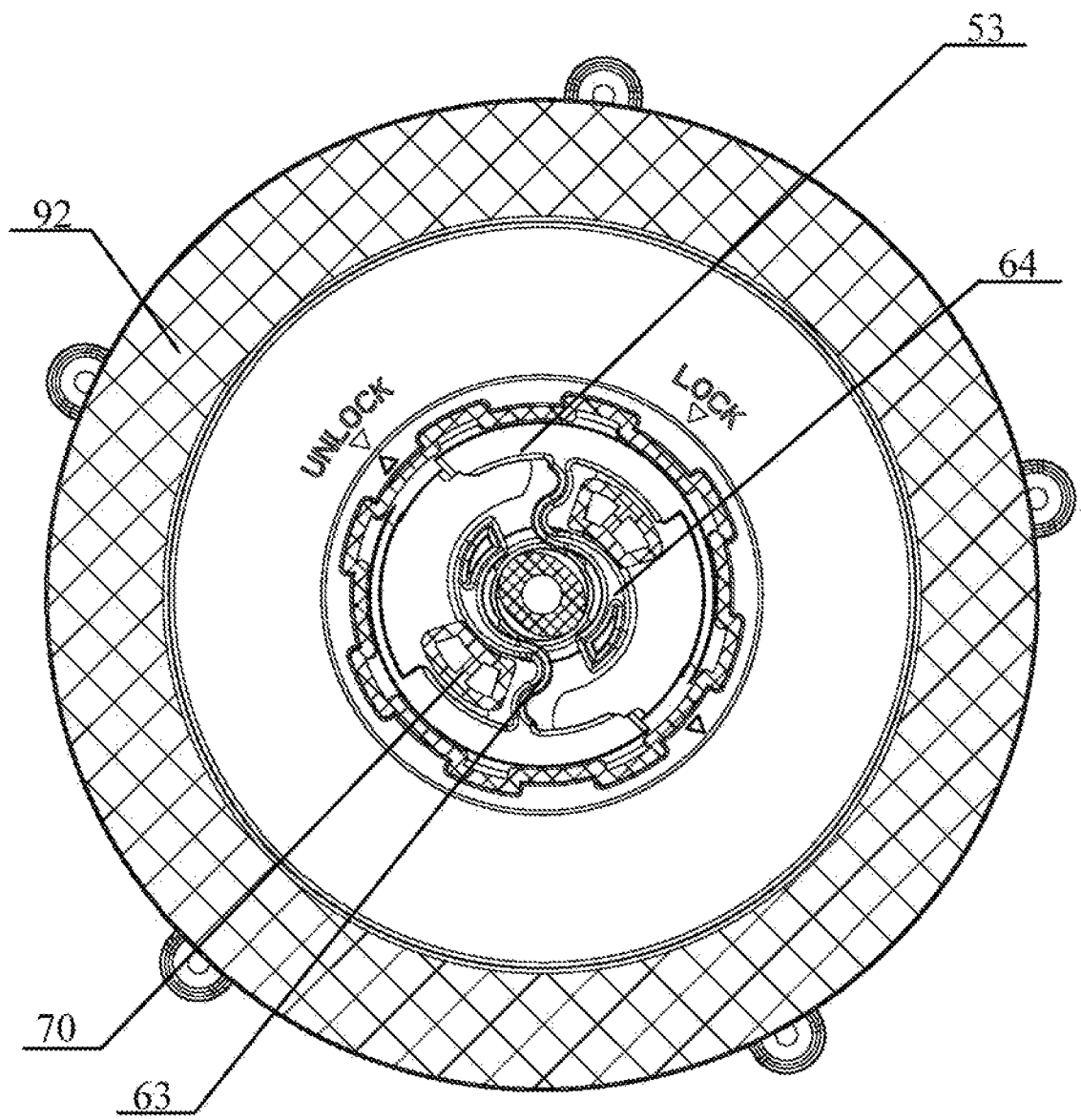
FIG. 14 is a transverse cross-sectional view at an angle of the filtering device (where the cross-section is perpendicular to the axis B and the center column is not clamped)
Figure 15:
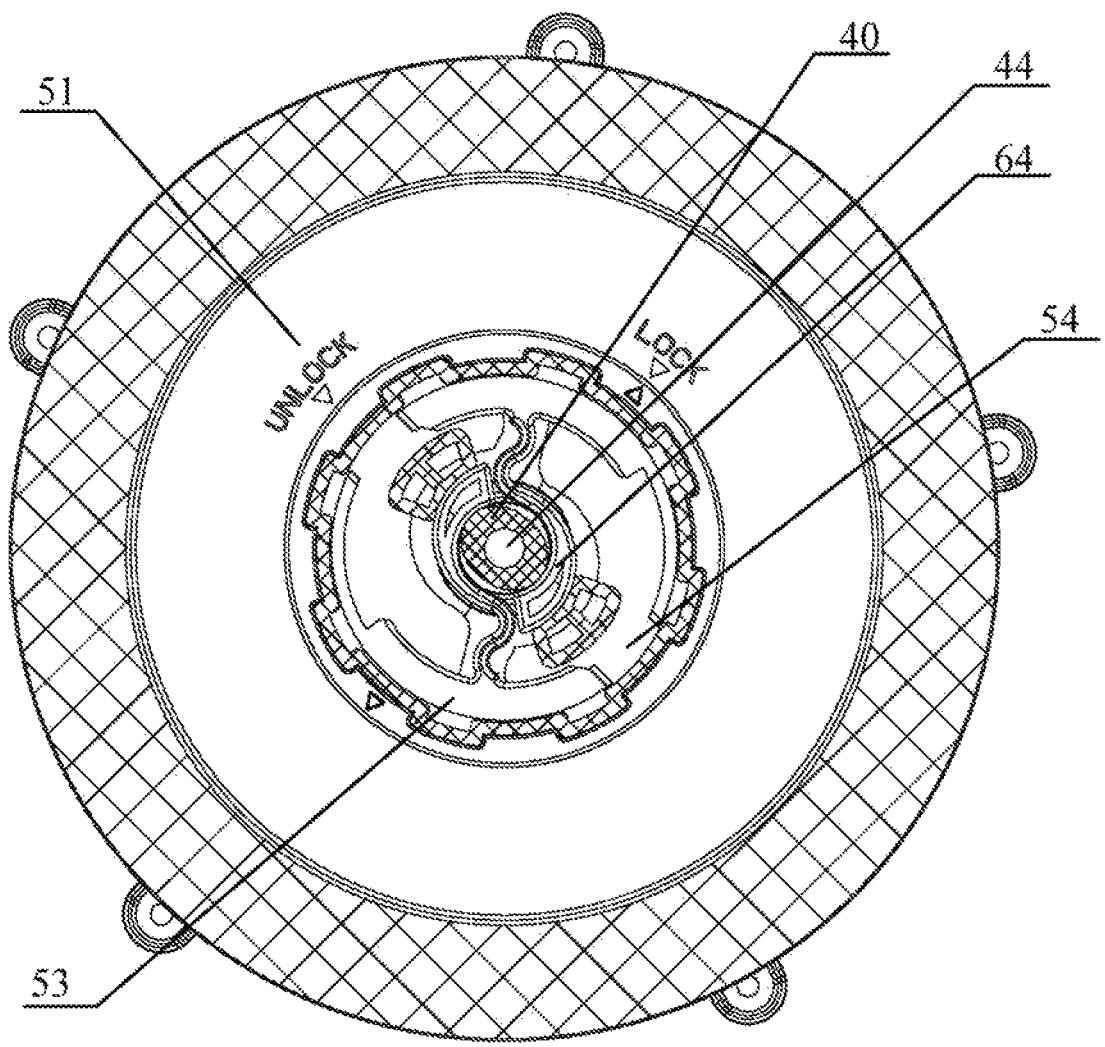
FIG. 15 is a transverse cross-sectional view at another angle of the filtering device (where the cross-section is perpendicular to the axis B and the center column is clamped)

The technical solutions of the embodiments of the present disclosure are explained and illustrated below with reference to the drawings of the embodiments of the present disclosure, but the embodiments below are only exemplary embodiments rather than all of the embodiments of the present disclosure. Other embodiments obtained by those skilled in the art based on the embodiments disclosed herein without making creative efforts shall all fall in the scope of the present disclosure.

In the present disclosure, the terms "upper," "lower," "side," "inner" and "outer" are used to describe the relative positions of the objects in the drawings, but these terms are not intended to limit the components, compositions, regions, etc. As for the number, "a plurality of" is just illustrative and may be set as needed.

Referring to FIGS. 1 to 15, a dust collector has a dust container 1, a machine head 2, a filtering device 3, and a float 93. The dust container 1 is provided with an air inlet 10, and a bottom of the dust container 1 is provided with four casters 11. The machine head 2 is installed on an upper end of the dust container 1 and includes a motor (not shown in the figure), an impeller (not shown in the figure), and an air outlet 20. The filtering device 3 is received in the dust container 1 and is in fluid communication between the air inlet 10 and the impeller for filtering dust. When the dust collector is working, the motor drives the impeller to generate negative pressure to make the airflow mixed with dust flow into the dust container 1 from the air inlet 10, flow into the machine head 2 after being filtered by the filtering device 3, and then discharged out of the dust collector via the air outlet 20. The rated power of the motor is between 100 W and 3000 W, exemplarily between 200 W and 1800 W, such as 960 W, 1200 W, 1320 W, or 1440 W. The capacity of the dust collector or the dust container 1 is between 0.5 gallons (1 gallon=3.785412 liters) and 30 gallons, exemplarily between 1 gallon and 20 gallons, such as 6 gallons, 9 gallons, 10 gallons, 12 gallons, 14 gallons, or 16 gallons.

Referring to FIGS. 2 to 15, the filtering device 3 includes a filter frame 4, a cartridge filter 92 sleeved outside the filter frame 4, an end cap 6 connected to an end of the cartridge filter 92, a cover 7 fitted outside the end cap 6, a sealing ring 8, an end ring 90, and a tray 91. The cartridge filter 92 is hollow, and the cartridge filter 92 and the filter frame 4 are each at least partially disposed in the dust container 1. The cover 7 is disposed under the end cap 6. The end ring 90 and the end cap 6 are disposed at opposite ends of the cartridge filter 92. The end ring 90 is connected to an upper end of the cartridge filter 92, made of a flexible material and sealed at a periphery of a lower end of a tray 91. The tray 91 is locked on a lower end surface of the machine head 2. The end cap 6 is disposed at and shields an end of the cartridge filter 92, and is provided with a through end hole 60, which is shielded by the cover 7. The filter frame 4 is provided with a center column 40, a bottom plate 41, longitudinal ribs 42, circumferential ribs 43, a through hole 44, a rib plate 45, and supporting ribs 46. The through hole 44 and the bottom plate 41 are disposed at an lower portion of the filter frame 4, and the center column 40 enters the cover 7 through the end hole 60 of the end cap 6. The through hole 44 is in communication with an upper side of the bottom plate 41 and runs through the center column 40, and the through hole 44 communicates the upper side of the bottom plate 41 and the inside of the cover 7, so that at least part of liquid/accumulated water sucked into the dust collector to the upper side of the bottom plate 41 flows into the cover 7 through the through hole 44, the accumulated water is reduced, the float 93 is facilitated to be normally floated and is prevented from sticking to the bottom plate 41. The filter frame 4 is integrally cage-shaped, the circumferential rib 43 and the longitudinal rib 42 are integrally formed and intersect with each other, and the center column 40 integrally extends from the center of the bottom plate 41. The cartridge filter 92 is formed with spaced ridges 920 or pleats and has pores for filtering dust. The center column 40 passes through the end hole 60, and the center column 40 integrally extends downward from the bottom plate 41. The cover 7 is rotatably maintained on the end cap 6 and is rotatable around the center column 40 in and against a rotating direction. The end cap 6 is provided with a plurality of clamping members 61 for pressing against the center column 40, and as the cover 7 is rotating along the rotating direction A relative to the end cap 6, the cover 7 pushes the clamping members 61 to move towards the center column 40 to make the clamping members 61 clamp the center column 40. As the cover 7 is rotating against the rotating direction A relative to the end cap 6, each of the clamping members 61 moves in a direction away from the center column 40 to release its clamping on the center column 40. The rotation of the cover 7 in and against the rotating direction A is around the center column 40. In the present embodiment, there are provided two of the clamping members 61 in the present embodiment, which however is merely an example, and the number is not limited thereto, and may be set as needed.

The through hole 44 penetrates downward from an upper surface 410 of the bottom plate 41 to a lower side of a lower end of the center column 40. The upper side of the bottom plate 41 defines a recessed region 411, and an upper end of the through hole 44 is disposed in the recessed region 411. The bottom plate 41 is flat-plate shaped, or may be center-depressed shaped. The longitudinal ribs 42 are circumferentially disposed at intervals, and lower ends of the longitudinal ribs 42 are integrally connected to the bottom plate 41. The rib plate 45 extends upward from the bottom plate 41 and is connected to the adjacent longitudinal ribs 42, and the lower ends of the longitudinal ribs 42, the rib plates 45 and the bottom plate 41 are enclosed to form the recessed region 411. The annular circumferential ribs 43 are disposed at intervals in a vertical direction, and the longitudinal ribs 42 intersect with the circumferential ribs 43 to form lattice openings through which air flows. The recessed region 411 of the present embodiment is relatively shallow, and is easy to accumulate water, which can be discharged in time through the through hole 44, and the depth and shape of the recessed region 411 are not limited to the present embodiment. The longitudinal rib 42 includes a first longitudinal rib 420 and a second longitudinal rib 421 that intersect each other, and the rib plate 45 is connected to the adjacent second longitudinal ribs 421. The plurality of longitudinal ribs 42 at least includes two groups of longitudinal ribs 42, each longitudinal rib 42 of each group of longitudinal ribs 42 is adjacent in sequence (adjacent in sequence: a longitudinal rib 42-1 is adjacent to an adjacent longitudinal rib 42-2, and the longitudinal rib 42-2 is adjacent to an adjacent longitudinal rib 42-3), and each longitudinal first rib 420-1, 420-2 and 420-3 of each group of longitudinal ribs 42 are parallel. The cross-section of each longitudinal second ribs 421 of the plurality of longitudinal ribs 42 is arc-shaped extending along a circumferential direction of the filter frame 4 and is on the same circumference (the cross section, i.e., a section perpendicular to the axis B). The float 93 is disposed in the filter frame 4 and is at the upper side of the bottom plate 41, the supporting rib 46 protrudes upward from the upper surface 410 of the bottom plate 41, and the float 93 is supported by the supporting rib 46 to be spaced apart from the upper surface 410 of the bottom plate 41, so that the float 93 is not attached to the upper surface 410 of the bottom plate 41, and the float 93 is easily naturally floated up when liquid level rises. When the liquid level rises to a certain height, the floater 93 rising to a predefined height can block an air inlet between the machine head 2 and the filter frame 4, and liquid is prevented from being sucked into the machine head 2. The supporting rib 46 extends radially inward from the corresponding longitudinal rib 42. The supporting ribs 46 separately extend radially inward from and parallel to the longitudinal first ribs 420 of the corresponding longitudinal ribs 42.

The rotational axis of the cover 7, i.e., the central axis around which the cover 7 rotates, is a virtual line, and passes through the end hole 60. In the present embodiment, the axis B is a central line of the center column 40, the rotational axis of the cover 7, and the central line of the cartridge filter 92. The cover 7 is provided with a plurality of pushing members 70, which correspond to the clamping members 61 one by one, and each pushing member 70 rotates along with the cover 7 as the cover 7 is rotating. The cover 7 is limited to rotate between a first angular position and a second angular position relative to the end cap 6. When cover 7 is at the first angular position (referring to FIG. 15, the center column 40 is clamped, and the protruding member 72 is stopped by a first blocking wall 55), each of the pushing members 70 presses against the corresponding clamping member 61 toward the center column 40 to make the clamping members 61 clamp the center column 40, and as the cover 7 is rotating from the first angular position around the center column 40 to the second angular position (referring to FIG. 14, at this moment, the center column 40 is released from clamping, and the protruding member 72 is located at the opening 54), each pushing member 70 rotates along with the cover 7, and the plurality of clamping members 61 move in a direction away from the center column 40 to release the clamping on the center column 40. The center column 40 is perpendicular to the end cap 6, and the through hole 44 is provided at a center of the end cap 6. The cover 7 can be in different angular positions based on different rotation angles rotated on the end cap 6, the difference in angular positions is distinguished based on the different rotation angles rotated by the cover 7, such as: the cover 7 is rotated another certain angle on the end cap 6 to form an angular position and then rotated a certain angle to form another angular position, and any angular position relative to the end cap 6 can be defined for the cover 7 as desired.

As the cover 7 is rotating relative to the end cap 6 along the rotating direction A, each pushing member 70 rotates along with the cover 7 to push the corresponding clamping member 61 to move toward the center column 40, so that the plurality of clamping members 61 clamp the center column 40. The clamping member 61 is provided with a projecting arcuate surface 62 facing away from the center column 40, and as the cover 7 is rotating around the center column 40 along the rotating direction A, each pushing member 70 slides along the projecting arcuate surface 62 of the corresponding clamping member 61 and presses against the projecting arcuate surface 62 to push the corresponding clamping member 61 to move toward the center column 40.

As the cover 7 is rotating along the rotating direction A, the pushing member 70 sequentially slides over any first region and any second region on the projecting arcuate surface 62. When the cover 7 is in any position between the first angular position and the second angular position, a vertical distance from the second region to the axis B is greater than a vertical distance from the first region to the axis B. When the cover 7 is at the first angular position, each pushing member 70 abuts against a third region of the projecting arcuate surface 62 of the corresponding clamping member 61. When the cover 7 is at the second angular position, each pushing member 70 abuts against a fourth region of the projecting arcuate surface 62 of the corresponding clamping member 61. And when the cover 7 is at any position between the first angular position and the second angular position, a vertical distance from the third region to the axis B of the cover 7 is greater than a vertical distance from the fourth region to the axis B. A region, over which the pushing member 70 slides, on the projecting arcuate surface 62, includes a linear region on a plane perpendicular to the axis B, i.e., the linear region is obtained by intersecting the plane with the region, over which the pushing member 70 slides, of the projecting arcuate surface 62. When the cover 7 is located at the first angular position, a vertical distance from a point of the linear region, where the pushing member 70 slides over along the rotating direction A in an earlier time, to the axis B is smaller than a vertical distance from a point of the linear region, where the pushing member 70 slides over along the rotating direction A in a later time, to the axis B. When the cover 7 is at the second angular position, a vertical distance from the point of the linear region, where the pushing member 70 slides over along the rotating direction A in an earlier time, to the axis B is smaller than the vertical distance from a point of the linear region, where the pushing member 70 slides over in a later time, to the axis B. When the cover 7 is at any position between the first angular position and the second angular position, a vertical distance from a point of the linear region, where the pushing member 70 slides over along the rotating direction A in an earlier time, to the axis B is smaller than a vertical distance from a point of the linear region, where the pushing member 70 slides over along the rotating direction A in a later time, to the axis B.

An outer peripheral surface of the center column 40 is provided with a thread 400, the clamping members 61 are provided with ribs 610 corresponding to the thread 400 of the center column 40, and as cover 7 is rotating around the center column 40 in the rotating direction A, the cover 7 pushes each clamping member 61 to move toward the center column 40 so that the plurality of clamping members 61 clamp the center column 40 and the ribs 610 are inserted into the thread 400 of the center column 40. The thread 400 is a double-end thread and includes a first thread 401 and a second thread 402 that coincides with the first thread 401 after rotating 180 degrees around an axis of the center column 40. There are provided two of the clamping members 61, and a rib 610 of one of the clamping members 61 is operative to coincide with a rib 610 of another of the clamping members 61 after rotating 180 degrees around the center column 40. After the two clamping members 61 clamp the center column 40, a rib 610 of one of the clamping members 61 is correspondingly embedded into the first thread 401, a rib 610 of another of clamping members 61 is correspondingly embedded into the second thread 402, and one of the clamping members 61 is operative to coincide with another of the clamping members 61 after rotating 180 degrees around the center column 40. The center column 40 is provided with a threaded member 403 and a shoulder 404, and the thread 400 is located on the outer peripheral surface of the threaded member 403. According to the present disclosure, after the center column 40 is locked by the clamping member 61, the rib 610 inserted into the thread of the center column 40 can effectively inhibit the clamping member 61 from moving up and down relative to the center column 40 and from breaking loose, which is advantageous for the center column 40 to be stably locked by the clamping member 61. When the cover 7 is at the first angular position, the ribs are embedded in the threads of the center column 40. As the cover 7 is rotating from the first angular position to the second angular position against the rotating direction A, the clamping member 61 moves in a direction away from the center column 40 to release the clamping of the center column 40. When the cover 7 rotates from the first angular position along the rotating direction A, the cover 7 drives the end cap 6 and the clamping member 61 to rotate along the rotating direction A and the ribs 610 of the clamping member 61 climb up along the threads 400. When the cover 7 rotates in the rotating direction A from the first angular position, the protruding member 72 pushes against the first blocking wall 55 to drive the end cap 6 and the clamping member 61 to rotate along the rotating direction A. As cover 7 is rotating along the rotating direction A relative to the end cap 6, the cover 7 pushes the clamping member 61 towards the rotational axis of the cover 7.

As the cover 7 is rotating around the center column 40 along the rotating direction A, each of the pushing member 70 rotates along with the cover 7, slides along the projecting arcuate surface 62 of the corresponding clamping member 61 and abuts against the projecting arcuate surface 62 to push the corresponding clamping member 61 to move toward the center column 40. The projecting arcuate surface 62 makes the clamping member 61 operate like a cam. As the center column 40 is rotating along the rotating direction A, the cover 7 pushes each clamping member 61 to move toward the threaded member 403, so that the clamping members 61 presses against the thread 400 of the threaded member 403 to clamp the threaded member 403. The shoulder 404 is cylinder-shaped having a radial dimension greater than the threaded member 403, which extends downward from a lower end of the shoulder 404.

The clamping member 61 is a cantilever arm integrally connected to the end cap 6, is curve-shaped and extends in a direction perpendicular to the axis B. The clamping member 61 include an elastic part 63 integrally extending from the end cap 6 and a clamping part 64 further extending out from the elastic part 63, and each clamping member 61 clamps the center column 40 by the provided clamping part 64. As the cover 7 is rotating against the rotating direction A, each clamping part 64 is moved in the direction away from the center column 40 by elastic force of the corresponding elastic part 63, to release the clamping on the center column 40. The projecting arcuate surface 62 is provided on the clamping part 64, and the pushing member 70 pushes the clamping part 64 to move toward the center column 40 by deformation of the elastic part 63. The clamping part 64 is further provided with a deformation opening 66 and a concave surface 65 facing away from the projecting arcuate surface 62. When each clamping member 61 clamps the center column 40, the concave surface 65 presses against the center column 40, and the concave surface 65 is arc-shaped corresponding to an outer contour of the center column 40 and is typically circular arc-shaped. The clamping part 64 is arc-shaped protruding in a direction away from the axis B. The deformation opening 66 is disposed between the projecting arcuate surface 62 and concave surface 65 to reduce deformation of clamping part 64 during molding. The clamping part 64 is as a part of the cam, and provides a cam-like effect. As the cover 7 is rotating in the rotating direction A, the pushing member 70 presses against the clamping member 61 toward the center column 40 or the axis B with an increasing amplitude, so that the clamping member 61 draws closer and closer to the center column 40 and finally clamps the center column 40, and the closer a distance from an area of the projecting arcuate surface 62 to a free end of the clamping member 61 is, the farther a distance from the area to the axis B.

The clamping member 61 is further provided with a third guiding bevel 68 for guiding center column 40 to be inserted among the clamping members, the third guiding bevel 68 being inclined relative to the axis B. The third guiding bevel 68 is disposed on an upper side of the clamping member 61 and is provided at the corresponding clamping part 64. The end cap 6 is provided with a recessed region 50 recessed upward from an lower side of the end cap 6, a bottom plate 51 corresponding to the recessed region 50, a plurality of first side walls 52, a baffle 53 bent and extended from corresponding first side wall 52, the opening 54, a first blocking wall 55, a plurality of second side walls 56, and a first annular rib 590. The bottom plate 41 is spaced from and opposed to the bottom plate 51, and the first side wall 52 is connected between the bottom plate 41 and the baffle 53. The first side wall 52 extends downwards from the bottom plate 51 and is circular arc-shaped and the second side wall 56 extends downward from the bottom plate 51 and is circular arc-shaped. The first side wall 52 and the second side wall 56 surround a periphery of the center column 40, and an inner diameter of the second side wall 56 is greater than an outer diameter of the first side wall 52. The first blocking wall 55 is connected between the bottom plate 51 and the baffle 53, and the first blocking wall 55 is vertically and integrally connected to the bottom plate 51. The first sidewall 52, the second sidewall 56, the baffle 53, the opening 54, the first blocking wall 55, and the first annular rib 590 are disposed in the recessed region 50, an outer diameter of the cover 7 is smaller than an inner diameter of the recessed region 50, and the cover 7 is disposed or partially disposed in the recessed region 50. The bottom plate 51 is provided with a plurality of through openings 570 corresponding to baffles 53 and running through the bottom plate 51 at a periphery of the first side wall 52, and the through opening 570 and the baffle 53 are spaced to form a sliding slot 571 disposed at the periphery of the first side wall 52, or the sliding slot 571 disposed at the periphery of the first side wall 52 is formed by the interval between the bottom plate 51 and the baffle 53. And the first side wall 52 and the baffle 53 separately constitute one wall of the sliding slot 571. A projection of the baffle 53 along a straight line parallel to the rotational axis of the cover 7 is covered by a projection of the corresponding through opening 570 along the aforementioned straight line. Since the baffle 53 is disposed in the recessed region 50, the baffle 53 has difficulty in removing the mold during molding. The through opening 570 is provided to facilitate to remove the mold along the axis B when molding the baffle 53, to make the molding of the baffle 53 easier. The baffle 53 is provided with a first guiding bevel 530 for the guiding protruding member 72 to enter the opening 54 and a second guiding bevel (not shown in the figure) for guiding protruding member 72 to separate from the opening 54, the first guiding bevel 530 being disposed at a lower side of the second guiding bevel and being in a splayed shape with the second guiding bevel. After completely passing through the opening 54, the protruding member 72 is limited inside the opening 54, and a circumferential dimension of the opening 54 is smaller than that of the protruding member 72. When the cover 7 is disassembled from the end cap 6, a certain external force is needed to be applied, and the opening 54 can be expanded more open to a certain extent by the protruding member 72 under the guiding of the second guiding bevel so as to separate the protruding member 72 from the opening 54. In the present embodiment, the protruding member 72 can be clipped into the opening 54 along the axis B during assembly, so that the opening 54 has a certain holding force on the protruding member 72, thus facilitating the cover 7 to be maintained on the end cap 6 when the protruding member 72 is at the position of the opening 54, and a sixth guiding bevel 720 for fitting the protruding member 72 into the opening 54 is provided on two sides of the protruding member 72. The baffle 53 and the clamping member 61 are disposed on two opposite sides of the first side wall 52 and the baffle 53 extends radially outward from each first side wall 52. The sliding slot 571 extends in a circumferential direction around the axis B and is arc-shaped, and the baffle 53 is perpendicular to the axis B. The sliding slot 571 and the protruding member 72 are disposed radially outside the first side wall 52.

The clamping member 61 extends from the first side wall 52. Further, the clamping member 61 extends integrally from the corresponding first side walls 52. The first side wall 52 is circular arc-shaped, and the elastic part 63 of the clamping member 61 is integrally connected to the first side wall 52. An outer edge of the second side wall 56 and an outer edge of the baffle 53 are on the same circumference (i.e., outer diameters of both are equal). The first side walls 52 are staggered with the second side walls 56, and the baffles 53 are staggered with the second side walls 56. An end of each second side wall 56 and an end of each baffle 53 are spaced to form the opening 54, the first blocking wall 55 is provided with a first side edge 551 facing away from the center column 40 and a second side edge 550 disposed between the first side edge 551 and the center column 40. The first side wall 52 extends from the second side edge 550 against the rotating direction A, and the second side wall 56 extends from the first side edge 551 along the rotating direction A. The first blocking wall 55 and the opening 54 are disposed at two opposite ends of the sliding slot 571, and the protruding member 72 is limited to rotate between the first blocking wall 55 and the opening 54, thereby limiting a rotation angle of the cover 7 relative to the end cap 6. The first blocking wall 55 and the opening 54 are disposed at two opposite ends of the baffle 53. The second side wall 56 is provided with a fifth guiding bevel 560 for guiding the protruding member 72 to enter the opening 54, where the fifth guiding bevel 560 and the first guiding bevel 530 are disposed on two opposite sides of the opening 54, and the fifth guiding bevel 560 and the second guiding bevel are disposed on two opposite sides of the opening 54.

The cover 7 is provided with a cover 73, an annular peripheral wall 71 integrally connected to an outer periphery of the cover 73, and the plurality of aforementioned protruding members 72 extending radially inward from the peripheral wall 71. When the cover 7 is mounted, the protruding member 72 can enter the sliding slot 571 from the opening 54 along a direction parallel to the axis B and when the protruding member 72 is located in the sliding slot 571, the baffle 53 abuts against the protruding member 72 and is located between the protruding member 72 and the cover 73. An upper end edge of the peripheral wall 71 extends radially outward to form an annular flange 710, which is provided with an annular groove 711 recessed in a direction away from the bottom plate 51. The end hole 60, each first side wall 52, and each through opening 570 are disposed in a region surrounded by the first annular rib 590, and the first annular rib 590 enters the annular groove 711 and presses against the sealing ring 8 in the annular groove 711 in a direction away from the bottom plate 51. The first annular rib 590 may also be provided on the cover 7, and correspondingly, the annular groove 711 may be provided in the end cap 6. The end hole 60 is irregular, and a projection of the clamping member 61 along the axis B is covered by a projection of the end hole 60 along the axis B. Since the clamping member 61 is disposed in the recessed region 50, the clamping member has difficulty in removing the mold when molded, and by employing this arrangement, the end hole 60 is provided not only for the center column 40 to pass through, but also for facilitating the mold removal when the clamping member 61 is molded, making it easy to mold the baffle 53. As the cover 7 is rotating around the center column 40 along the rotating direction A, the protruding member 72 can rotate along the sliding slot 571 and rotate along with the cover 7. When the protruding member 72 rotates along the sliding slot 571 to the first blocking wall 55 and then further screws the cover 7, the protruding member 72 can press against the first blocking wall 55 to drive the end cap 6 and the clamping member 61 to rotate, making the rib 610 rotate to climb up along the thread 400. As the rib 610 is climbing up along the thread 400, the cover 7 follows the upward movement, and the baffle 53 presses against the protruding member 72 upwards. The baffle 53 is used to stop at a side of the protruding member 72 to prevent the cover 7 from separating from the end cap 6. Further, the baffle 53 is used to stop at a lower side of the protruding member 72 to prevent the cover 7 from separating downward from the end cap 6.

The annular peripheral wall 71 and the cover 73 form an accommodating cavity. The pushing member 70 is accommodated in the accommodating cavity and integrally extends upwards from the cover 73, and the protruding member 72 is accommodated in the accommodating cavity and integrally extends from the peripheral wall 71. The pushing member 70 extends in a direction parallel to the axis B, and the protruding member 72 extends in a direction perpendicular to the axis B. The baffle 53, the first side wall 52, the second side wall 56, and the clamping member 61 are accommodated in the accommodating cavity. The cover 7 is further provided with a plurality of reinforcing ribs 76, which are connected between the cover 73 and the pushing member 70 and are also connected between the annular peripheral wall 71 and the pushing member 70.

A side of the pushing member 70 facing the center column 40 is provided with a first blocking rib 700. The pushing member 70 is provided with a pressing surface 701 for pressing against the projecting arcuate surface 62. The pressing surface 701 is a curved surface matching the projecting arcuate surface 62, the first blocking rib 700 protrudes out of the pressing surface 701, where the pressing surface 701 can be circular arc-shaped or non-circular arc-shaped and the pressing surface 701 is exemplarily as such: the closer a region of the pressing surface 701 to the elastic part 63 of the corresponding clamping member 61 is, the closer the region of the pressing surface 701 to the axis B is. As the rib 610 is climbing up along the thread 400, the clamping member 61 presses against the first blocking rib 700 upwards on the upper side of the clamping member 61.

The cover 7 is further provided with a second blocking rib 702 on a lower side of the clamping member 61, and the clamping member 61 the second blocking rib 702 abuts on each other up and down or have an up-and-down gap therebetween. When the clamping member 61 is in a state of clamping the center column 40 and/or when the protruding member 72 is in the opening 54, projections of the clamping member 61 and the second blocking rib 702 along the axis B partially overlap, so that the second blocking rib 702 stops the clamping member 61, thus suppressing downward deflection of the clamping member 61. The gap between the second blocking rib 702 and the clamping member 61 along the axis B is 0 mm to 3 mm, exemplarily 0.5 mm or 1 mm. The second blocking rib 702 is connected between each pushing member 70. The second blocking rib 702 integrally extends from the cover 73 along a direction parallel to the axis B and is connected between the pushing members 70. The threaded member 403 enters a space enclosed by the second blocking rib 702.

The end cap 6 is further provided with a plurality of guiding elements 74 and a second annular rib 75. The guiding elements 74 are disposed inside the end cap 6 and distributed on a periphery of the end hole 60, and each of the guiding elements 74 is provided with a fourth guiding bevel 740 for guiding the center column 40 to be inserted into the end hole 60. The end hole 60 and each guiding element 74 are disposed within the range enclosed by the second annular rib 75, and each guiding element 74 is integrally connected to the second annular rib 75. A projection of the first side wall 52 along the axis B is covered by a projection of the second annular rib 75 along the axis B, and the through hole 570 is also disposed on the periphery of the second annular rib 75, where the second annular rib 75 is circular ring-shaped. The through opening 570 communicates between the sliding slot 571 and an internal space of the cartridge filter 92, the cartridge filter 92 has an accommodating space 921 for accommodating the filter frame 4, where the accommodating space 921 belongs to an internal space of the cartridge filter 92, the through opening 570 communicates between the sliding slot 571 and the accommodating space 921, and the accommodating space 921 and the cover 7 are on opposite sides of the end cap 6.

FIGS. 16 to 22 show a modification to the cover 7 and the end cap 6 of the dust collector of the present disclosure, and the modification mainly shows some features added to the cover 7 and the end cap 6.

Referring to FIGS. 16 to 22, the modified cover 7 and end cap 6 are provided, and the cover 7 and end cap 6 in FIGS. 16 to 22 have the following main changes: the cover 7 is added with a pointing arrow 77, a first interference member 78 and an extending member 771; the end cap 6 is added with a second blocking wall 94, a second interference member 95 and a third interference member 96; where the arrangement may also be provided as: the first interference member 78 is provided at the cover 7, and the second interference member 95 and the third interference member 96 are provided at the end cap 6.

The pointing arrow 77 is not only used to indicate the angular position (e.g., lock position, unlock position) of the cover 7 relative to the end cap 6, but also facilitates hand holding and applying force to screw the cover 7, since both radial ends (an arrow end 773 and a non-arrow end 774) of the pointing arrow 77 are radially beyond the annular peripheral wall 71 of the cover 7.

The rotational axis of the cover 7, i.e., the central axis around which the cover 7 rotates, is a virtual line. The radial direction in the present disclosure is considered to be the radial direction of the cover 7, and the radial direction is perpendicular to and intersects the rotational axis of the cover 7. In the present embodiment, the axis B is the central line of the center column 40, the rotational axis of the cover 7, and the central line of the cartridge filter 92. The protruding member 72 is limited to rotate between the first blocking wall 55 and the second blocking wall 94 along the sliding slot 571. After the protruding member 72 rotates to the first blocking wall 55 along the rotating direction A, the first blocking wall 55 stops the protruding member 72 to prevent the cover 7 from further rotating relative to the end cap 6 along the rotating direction A. After the protruding member 72 rotates to the second blocking wall 94 against the rotating direction A, the second blocking wall 94 stops the protruding member 72 to prevent the cover 7 from further rotating relative to the end cap 6 against the rotation direction A, where the first blocking wall 55 and the second blocking wall 94 are at opposite ends of the sliding slot 571 and opposite to each other along the rotating direction A. The first blocking wall 55 and the second blocking wall 94 are separately connected between the first side wall 52 and the second side wall 56, and further, the first blocking wall 55 and the second blocking wall 94 are separately connected between an end of the first side wall 52 and an end of the second side wall 56. The first side walls 52 and the second side walls 56 jointly surround the rotational axis of the cover 7. Each first side wall 52 and each second side wall 56 are staggered, and each second blocking wall 94 includes a third side edge 940 facing away from the rotational axis of the cover 7 and a fourth side edge 941 disposed between the third side edge 940 and the rotational axis of the cover 7. Each first side wall 52 is connected to the second side edge 550 and the fourth side edge 941, and each second side wall 56 is connected to the first side edge 551 and the third side edge 940. Each first side wall 52 extends along the rotating direction A from the fourth side edge 941 of the second blocking wall 94, and each second side wall 56 extends against the rotating direction A from the third side edge 940 of the second blocking wall 94. The first side wall 52 is disposed radially inward of the sliding slot 571.

The extending member 771 extends into the through opening 570 and as the cover 7 is rotating relative to the end cap 6, the extending member 771 rotates along with the cover 7 and is limited to rotate between opposite ends of the through opening 570, by employing such design, the rotation of the cover 7 relative to the end cap 6 is limited to a certain extent. The accommodating space 921 and the cover 7 are disposed at opposite sides of the end cap 6. The extending member 771 is integrally connected to the protruding member 72, and extends upward from an upper side of the protruding member 72. The extending member 771 extends from the protruding member 72 in a direction of nearing the accommodating space 921, and is parallel to the rotational axis of the cover 7. The through opening 570 is circular arc-shaped. The protruding member 72 has a first side and a second side opposite to each other, the baffle 53 is used to stop a first side of the protruding member 72 to prevent the cover 7 from separating from the end cap 6, and the extending member 771 extends from the second side of the protruding member 72 to a direction away from the baffle 53. In the present embodiment, the first side of the protruding member 72 is a lower side, and the second side of the protruding member 72 is an upper side. When the cover 7 is fitted onto the end cap 6, the protruding member 72 enters the sliding slot 571 from the opening 54 and the extending member 771 sequentially passes the opening 54, and the sliding slot 571 to enter the opening 570. The extending member 771 is provided with a seventh guiding bevel 772, for guiding the extending member 771 into the through opening 570 when the cover 7 is mounted on the end cap 6.

The through opening 570 has an arc-shaped outer side edge 572. The extending member 771 is disposed radially inward of the outer side edge 572, and when the extending member 771 is at any position between the two opposite ends of the through opening 570, the extending member 771 is in contact with the outer side edge 572 or needs to move radially outward by a first distance to be in contact with the outer side edge 572. The first distance is 0 mm to 1.2 mm, and is exemplarily 0.2 mm, 0.4 mm, 0.6 mm. By employing such design, the extending member 771 radially keeps in contact with or close to the outer side edge 572 of the through opening 570, and will be stopped by the outer side edge 572 of the through opening 570 when slightly radially outwardly deviated, so that the excessive deviation of the cover 7 in the radial direction is suppressed. Radially outwardly moving the extending member 771 is intended for the purpose of convenient and accurate description of the specific spacing between the extending member 771 and the outer side edge 572, and is for the purpose of description. Thus the extending member 771 is not necessarily moved radially outward. The through opening 570 is further provided with an arc-shaped inner side edge (not numbered) opposite to the outer side edge 572 in the radial direction. The extending member 771 is disposed on a radial outer side of the inner side edge, and when the extending member 771 is disposed at any position between two opposite ends of the through opening 570, the extending member 771 is operative to contact the inner side edge after moving inwards a second distance in the radial direction. The second distance is larger than the first distance, and ranges from 1.3 mm to 3.1 mm, exemplarily 1.8 mm, 2 mm, or 2.5 mm. The inner side edge of the through opening 570 has been seamlessly joined to the outer surface of the first side wall 52, and the inner side edge constitutes a portion of the outer side of the first side wall 52. The above is to suppress the excessive deviation in the radial direction of the cover 7 by the outer side edge restriction, and the inner side edge and the extending member 771 may also be employed to limit the excessive deviation in the radial direction of the cover 7: a distance between the extending member 771 and the inner side edge is set so small that as the extending member 771 is rotating along with the cover 7, the extending member 771 abuts the inner side edge or has a second distance from the inner side edge of 0 mm to 1.2 mm. The cover 7 may be provided with a plurality of extending members 771 for collectively restraining the cover 7 from excessive deviation in the radial direction. Each extending member 771 extends into a corresponding through opening 570, and is spaced at equidistance from the rotational axis of the cover 7. The extending members 771 are evenly distributed over a circumference around the rotational axis of the cover 7, where one of the extending members 771 is on an opposite side of the rotational axis of the cover 7 from the other extending member 771. The through opening 570 is provided with a first end and a second end that are opposite to each other in a rotating direction A of the cover 7, the extending member 771 is limited to rotate between the first end and the second end as the cover 7 is rotating relative to the end cap 6. The first blocking wall 55 is located at the first end of the through opening 570, and a second end of the through opening 570 is located between the first blocking wall 55 and the second blocking wall 94 in the rotating direction A.

The cover 7 is further provided with a second interference position (referring to FIG. 18), and a first interference position (referring to FIG. 16) relative to the end cap 6. The interference position in the present disclosure is a position where the cover 7 interferes with the end cap 6 during rotation. When the cover 7 is in the first angular position, the plurality of clamping members 61 clamp the center column 40, and when the cover 7 is at the second angular position, the plurality of clamping members 61 do not clamp the center column 40. As the cover 7 rotates from the second angular position to the first angular position along the rotating direction A, the cover 7 pushes the plurality of clamping members 61 to move towards the center column 40, so that the plurality of clamping members 61 clamp the center column 40. The cover 7 can sequentially pass by the first interference position and the second interference position during rotating from the first angular position to the second angular position against the rotating direction A, and can sequentially pass by the second interference position and the first interference position during rotating from the second angular position to the first angular position along the rotating direction A. When the cover 7 rotates to pass by the first interference position, the cover 7 interferes with the end cap 6, and when the cover 7 rotates to pass by the second interference position, the cover 7 interferes with the end cap 6. By employing such design, in a normal rotating process relative to the end cap 6, the cover 7 interferes with the end cap 6 at a proper position, so that a prompting function is realized, an operator can be reminded of a position to which the cover 7 is rotated or is around to be rotated, thereby improving the user experience. As rotating relative to the end cap 6 between the first interference position and the second interference position, the cover 7 does not pass by other interference positions, thus rotating relatively smoothly relative to the end cap 6. When the cover 7 passes by the first interference position, the clamping members 61 are in a state of clamping the center column 40, and when the cover 7 passes by the second interference position, the plurality of clamping members 61 do not clamp the center column 40.

A first interference member 78 is provided on one of the cover 7 and the end cap 6, and a second interference member 95 and a third interference member 96 are provided on the other one of the cover 7 and the end cap 6. When the cover 7 passes by the first interference position, the first interference member 78 interferes with the second interference member 95, and when the cover 7 passes by the second interference position, the first interference member 78 interferes with the third interference member 96. Further, the first interference member 78 is provided on the cover 7 and integrally extends from the cover 73, and extends in a direction of nearing the accommodating space 921. The second interference member 95 and the third interference member 96 are protrusions provided on the end cap 6, and are integrally connected to the bottom plate 41 and protrude from the bottom plate 41.

The first interference member 78 is provided with a first guiding surface 780 and a second guiding surface 781. When the cover 7 passes by the first interference position against the rotating direction A, the first guiding surface 780 interferes with the second interference member 95. When the cover 7 passes by the first interference position along the rotating direction A, the second guiding surface 781 interferes with the second interference member 95. When the cover 7 passes by the second interference position against the rotating direction A, the first guiding surface 780 interferes with the third interference member 96. When the cover 7 passes by the second interference position along the rotating direction A, the second guiding surface 781 interferes with the third interference member 96. The first guiding surface 780 and the second guiding surface 781 form a splayed shape. The second interference member 95 is provided with a third guiding surface 950 and a fourth guiding surface 951, and the third interference member 96 is provided with a fifth guiding surface 960 and a sixth guiding surface 961.

When the cover 7 passes by the first interference position against the rotating direction A, the third guiding surface 950 interferes with the first interference member 78, and specifically, the third guiding surface 950 interferes with the first guiding surface 780 of the first interference member 78. When the cover 7 passes by the first interference position in the rotating direction A, the fourth guiding surface 951 interferes with the first interference member 78, where, specifically, the fourth guiding surface 951 interferes with the second guiding surface 781 of the first interference member 78. When the cover 7 passes by the second interference position against the rotating direction A, the fifth guiding surface 960 interferes with the first interference member 78, where, specifically, the fifth guiding surface 960 interferes with the first guiding surface 780 of the first interference member 78. And when the cover 7 passes by the second interference position in the rotating direction A, the sixth guiding surface 961 interferes with the first interference member 78, where, specifically, the sixth guiding surface 961 interferes with the second guiding surface 781 of the first interference member 78. The third guiding surface 950 and the fourth guiding surface 951 form a splayed shape, and so do the fifth guiding surface 960 and the sixth guiding surface 961. The second interference member 95 is integrally connected to one of the first side walls 52, and the third interference member 96 is integrally connected to one of the second side walls 56. Further, the second interference member 95 is integrally connected to an inner side surface of one of the first side walls 52, and the third interference member 96 is integrally connected to an inner side surface of one of the second side walls 56. The circle where the first side wall 52 is located is coaxial with the circle where the second side wall 56 is located, and a diameter of the first side wall 52 is greater than that of the second sidewall 56. One of the pushing member 70 is disposed parallel with the first interference member 78, and a reinforcing rib 782 is connected between the one of the pushing members 70 and the first interference member 78; the first interference member 78 is column-shaped and parallel to the rotational axis of the cover 7. The first guiding surface 780, the second guiding surface 781, the third guiding surface 950, the fourth guiding surface 951, the fifth guiding surface 960 and the sixth guiding surface 961 are each perpendicular to the bottom plate 41, and the first guiding surface 780, the second guiding surface 781, the third guiding surface 950, the fourth guiding surface 951, the fifth guiding surface 960 and the sixth guiding surface 961 are each parallel to the rotational axis of the bottom plate cover 7.

When the cover 7 rotates to pass by the first interference position, the force required to screw the cover 7 increases discontinuously, and when the cover 7 rotates to pass by the second interference position, the force required to screw the cover 7 also increases discontinuously. Herein, "discontinuously increasing" means that the required force does not change smoothly, and does not remain unchanged, but increases in a jumping manner. A difference value in the rotation angle between the first angular position and the first interference member is 0.01 to 19 degrees (i.e., the cover 7 is rotated from the first angular position by 0.01 to 19 degrees to reach the first interference member, and vice versa), exemplarily 0.1, 0.9, 2, 5 degrees. A difference value in the rotation angle between the second angular position and the second interference position is 0.01 to 19 degrees, exemplarily 0.1, 0.9, 2, 5 degrees. And a difference value in the rotation angle between the first angular position and the second angular position is 50 to 100 degrees, exemplarily 53, 60, 68, 70 degrees. The difference value of the rotation angle between the first angular position and the first interference position is very small, so that the cover 7 enters the first angular position just after passing by the first interference position along the rotating direction A. Further, once the cover 7 passes by the first interference position along the rotating direction A, the cover 7 enters the first angular position; by employing such design, the first interference position and the first angular position are closely adjacent; the difference value of the rotation angle between the second angular position and the second interference position is very small, so that the cover 7 enters the second angular position just after passing by the second interference position against the rotating direction A. Further, the cover 7 enters the second angular position once passing by the second interference position against the rotating direction A; by employing such design, the second interference position and the second angular position are closely adjacent. The existence of the first interference position enables the cover not to easily leave the first angular position, thereby facilitating the cover 7 to be kept at the first angular position. And the existence of the second interference position enables the cover not to easily leave the second angular position, thereby facilitating the cover 7 to be kept at the second angular position. When the cover 7 passes by the first interference position in the rotating process, obvious interference friction sound occurs due to the interference between the cover 7 and the end cap 6, and when the cover 7 passes by the second interference position in the rotating process, obvious interference friction sound occurs due to the interference between the cover 7 and the end cap 6, and the sound can also play a role in prompting.

In other embodiments, following design may also be employed. A cover 7 is provided with a first interference member and a second interference member, an end cap 6 is provided with a third interference member and a fourth interference member, when the cover 7 passes by a first interference position, the first interference member interfere with the third interference member, and when the cover 7 passes by a second interference position, the second interference member interferes with the fourth interference member.

The first blocking wall 55 and the second blocking wall 94 are disposed at two opposite ends of the sliding slot 571, and the first blocking wall 55 is opposite to the second blocking wall 94 in the rotating direction A. The protruding member 72 is limited to rotate between the first blocking wall 55 and the second blocking wall 94 along the sliding slot 571, and after the protruding member 72 rotates to the first blocking wall 55 along the rotating direction A, the first blocking wall 55 stops the protruding member 72 to prevent the cover 7 from continuously rotating relative to the end cap 6 along the rotating direction A. After the protruding member 72 rotates to the second blocking wall 94 against the rotating direction A, the second blocking wall 94 stops the protruding member 72 to prevent the cover 7 from continuously rotating relative to the end cap 6 along the rotating direction A. And a rotation range of the cover 7 relative to the end cap 6 is effectively limited via the first blocking wall 55 and the second blocking wall 94, so as to prevent the user from screwing the cover 7 for an excessive number of turns, thereby improving the user experience. The end cap 6 is provided with a plurality of first blocking walls 55, and a plurality of second blocking walls 94, where the first side wall 52 is connected between the first blocking walls 55 and the second blocking walls 94. The first side wall 52, the first blocking wall 55, and the second blocking wall 94 are each integrally connected to the bottom plate 41. And the first side wall 52, the first blocking wall 55, the second blocking wall 94, and the blocking plate 53 are disposed on a side of the bottom plate 41, and the accommodating space 921 is disposed on an opposite side of the bottom plate 41. The first side wall 52, the first blocking wall 55, and the second blocking wall 94 are each perpendicular to the bottom plate 41, and the blocking plate 53 is parallel to the bottom plate 41. The angle by which the protruding member 72 rotates from the first blocking wall 55 to the second blocking wall 94 ranges from 75 degrees to 105 degrees, exemplarily 90 degrees.

Figure 16:
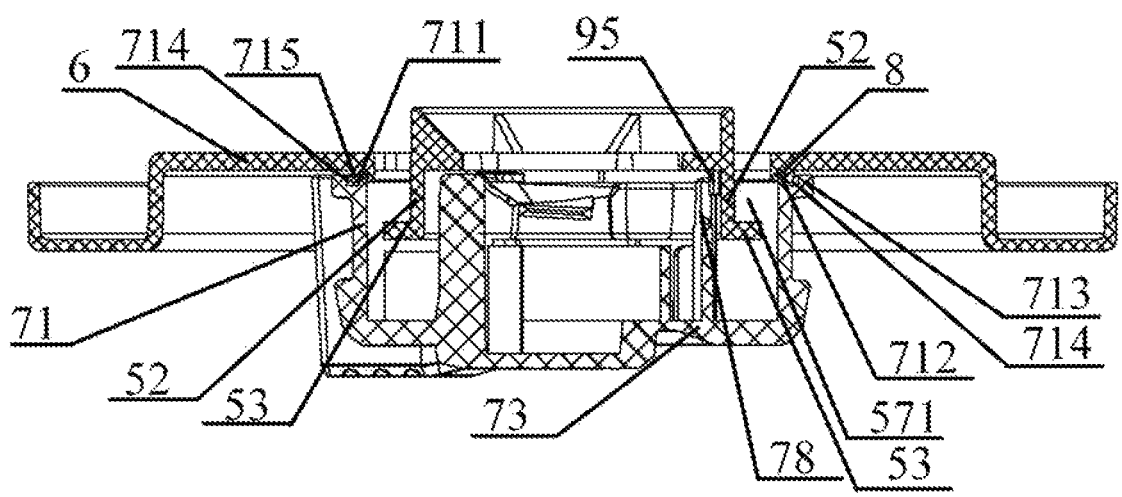
FIG. 16 is a longitudinal cross-sectional view at an angle of an improved end cap and an improved cover at an angle (where the cross-section is parallel to an axis B and a first interference member interferes with the second interference member)
Figure 17:
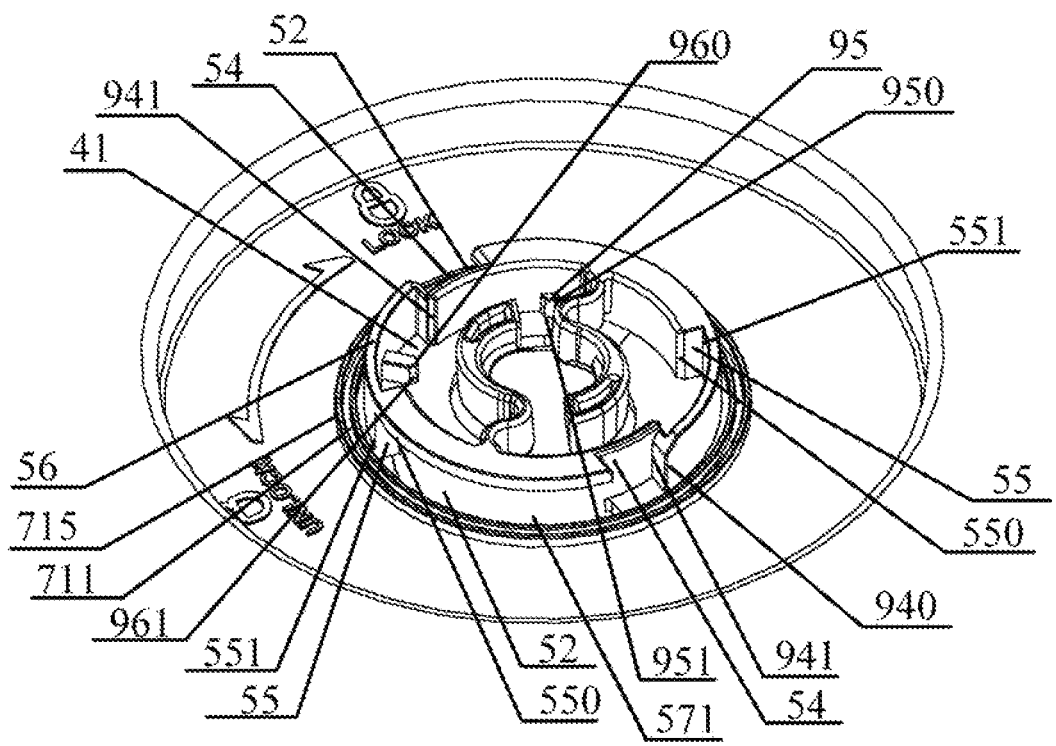
FIG. 17 is a partial perspective view of the improved end cap.
Figure 18:
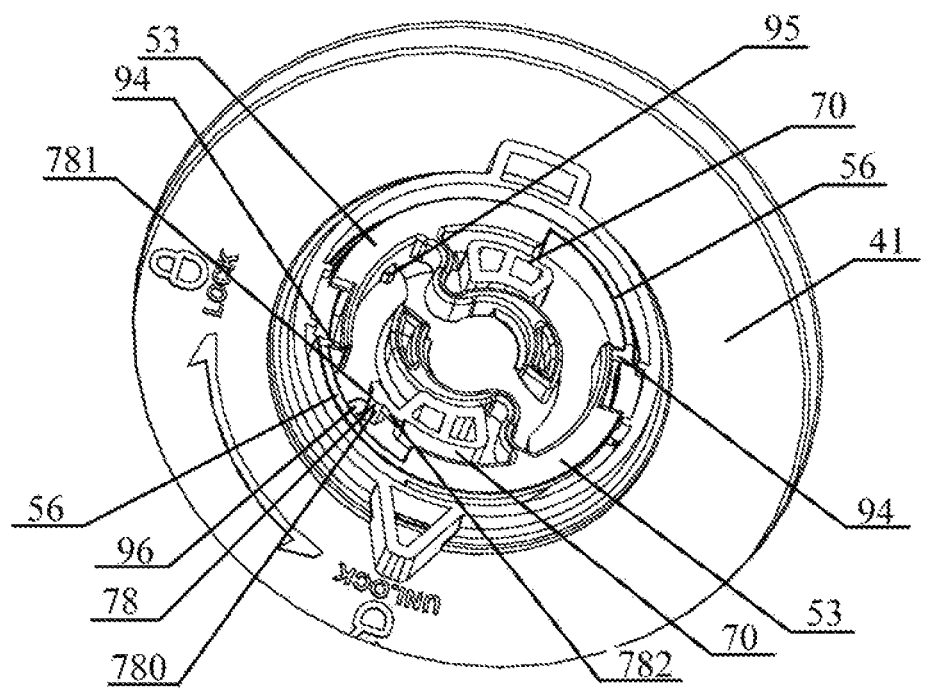
FIG. 18 is a cross-sectional view at another angle of the improved end cap and cover (the cross-section is perpendicular to the axis B and a second guide surface interferes with a sixth guide surface)
Figure 19:
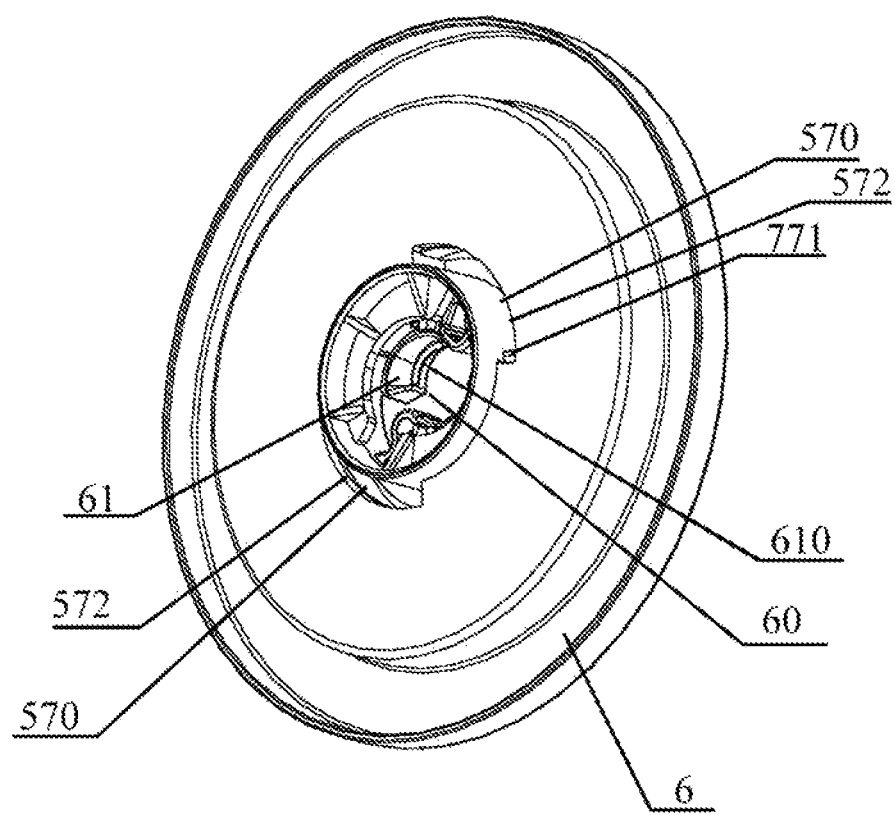
FIG. 19 is a perspective view at an angle of the improved end cap and cover.
Figure 20:
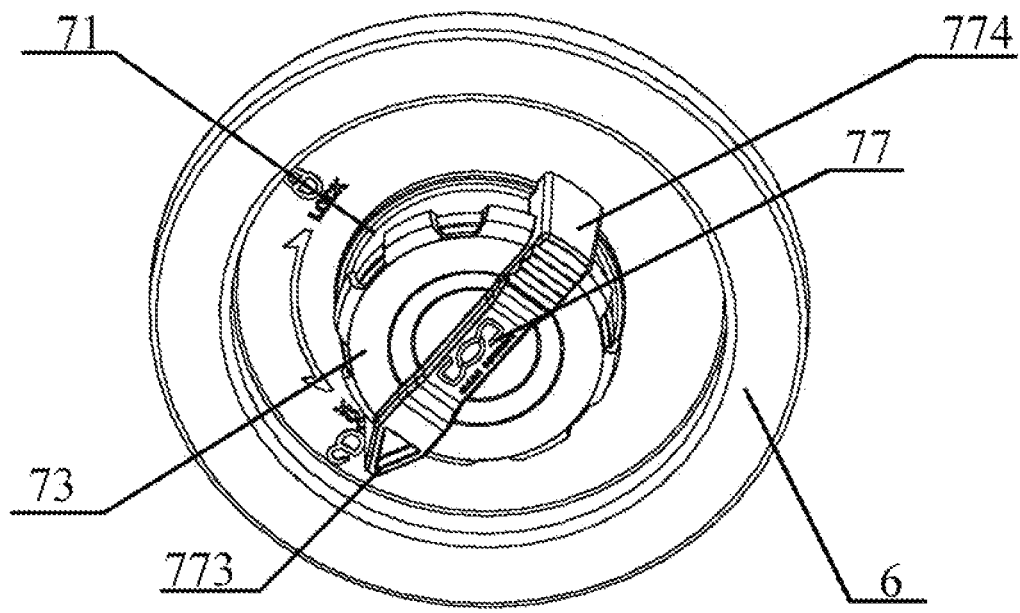
FIG. 20 is a perspective view at another angle of the improved end cap and cover.
Figure 21:
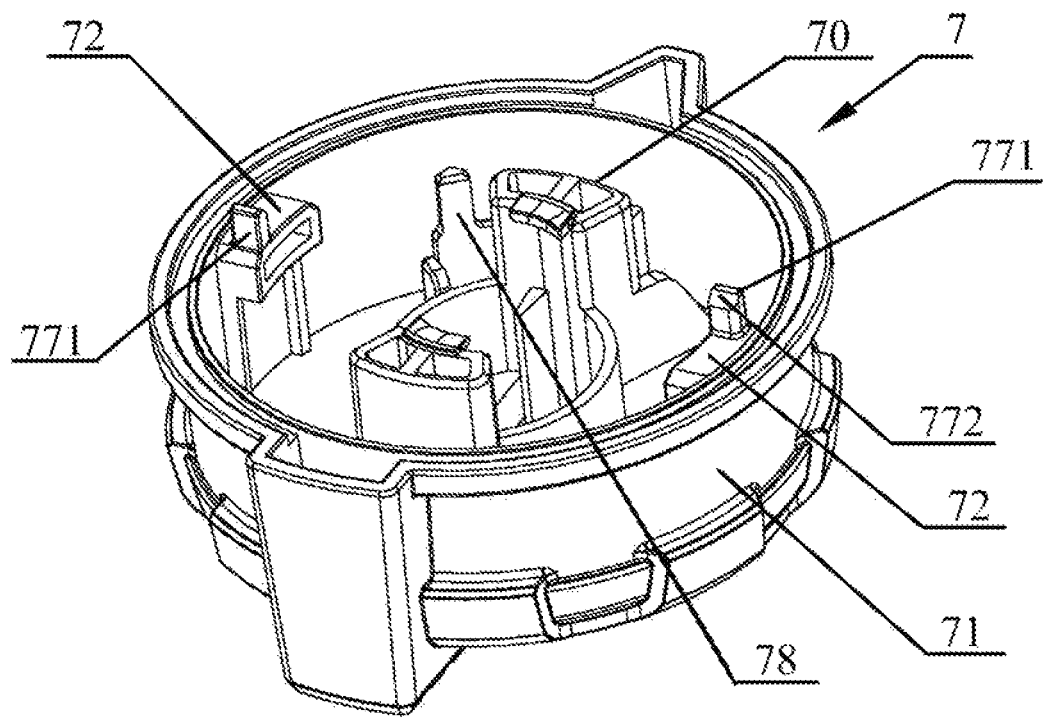
FIG. 21 is a perspective view at an angle of the improved cover.
Figure 22:
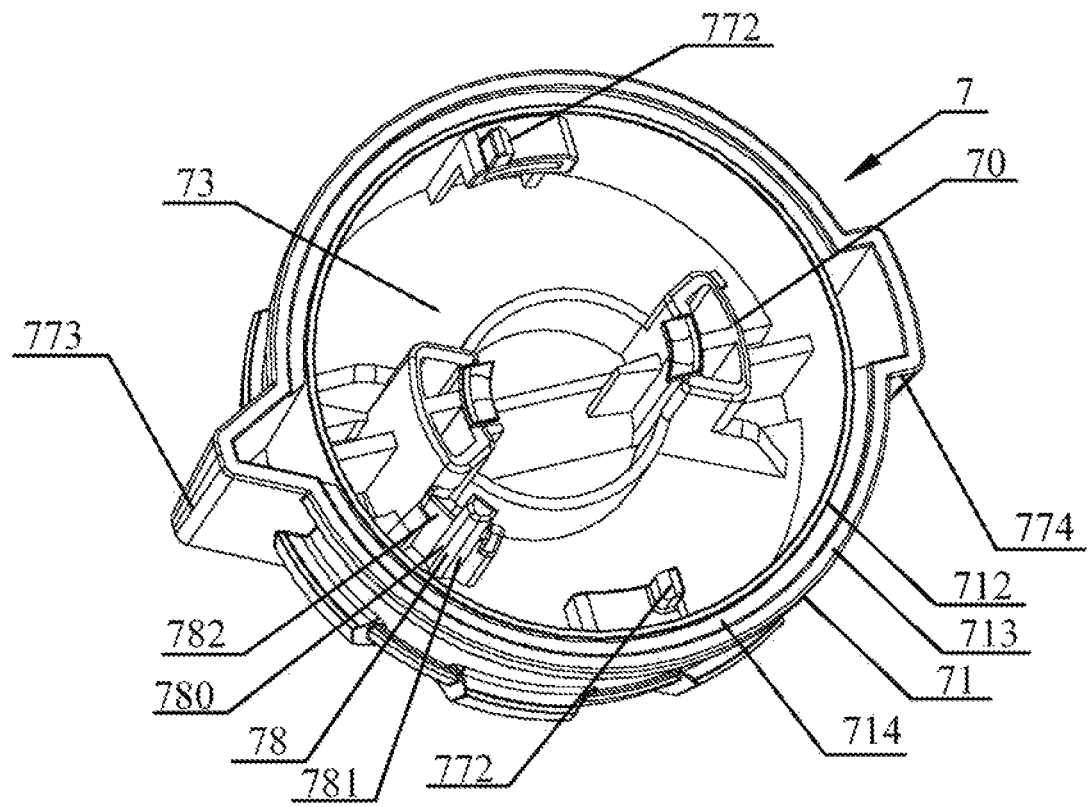
FIG. 22 is a perspective view at another angle of the improved cover.

In FIG. 16, the annular groove 711 is opened in the end cap 6, and a third annular rib 712 of the annular peripheral wall 71 enters the annular groove 711 and presses against the sealing ring 8 in the annular groove 711. And a second annular groove 714 is defined between a fourth annular rib 713 and the third annular rib 712 of the annular peripheral wall 71, and a fifth annular rib 715 of the end cap 6 is maintained in the second annular groove 714. The annular peripheral wall 71, the third annular rib 712, the annular groove 711, the fourth annular rib 713, the second annular groove 714, and the fifth annular rib 715 are each in a shape of a circular ring having the rotational axis of the cover 7 as the central axis.

The foregoing merely illustrates some specific embodiments of the present disclosure, but the scope of the present disclosure will not be limited thereto, and those skilled in the art should understand that the present disclosure includes but is not limited to the drawings and the contents described in the above specific embodiments. Any modifications which do not depart from the functional and structural principles of the present disclosure are intended to be included within the scope of the appended claims.

What is claimed is:

1. A dust collector, comprising: a filter frame, a cartridge filter sleeved outside the filter frame, an end cap connected to the cartridge filter, and a rotatable cover maintained at the end cap, wherein the end cap is provided with a sliding slot, a baffle, and a bottom plate spaced from the baffle, the cover is provided with a protruding member that is operative to rotate with the cover along the sliding slot, the baffle is configured to block at a side of the protruding member to prevent the cover from separating from the end cap, the cartridge filter comprises an accommodating space for accommodating the filter frame, the bottom plate is provided with a through opening through the bottom plate and disposed opposite to the baffle, wherein the through opening communicates between the sliding slot and the accommodating space, the cover is further provided with an extending member extending into the through opening, and the extending member rotates with the cover and is limited to rotate between two opposite ends of the through opening in a process that the cover rotates relative to the end cap.

2. The dust collector of claim 1, wherein the filter frame is provided with a center column, and the cover is operative to rotate around the center column along and against a rotating direction, wherein an outer peripheral surface of the center column is provided with a thread, the end cap is provided with a plurality of clamping members, wherein each of the clamping members is provided with a rib, and in a process that the cover rotates along the rotating direction relative to the end cap, the cover pushes the plurality of clamping members to move towards the center column, to make the plurality of clamping members clamp the center column and the ribs embedded into the thread of the center column.

3. The dust collector of claim 2, wherein the end cap is provided with a first blocking wall disposed at one end of the sliding slot, wherein in response to the protruding member rotating with the cover along the sliding slot to the first blocking wall thus further screwing the cover, the protruding member pushes the first blocking wall and drives the end cap and the clamping members to rotate, driving the ribs to rotate to climb up along the thread.

4. The dust collector of claim 2, wherein when the cover is located at a first angular position relative to the end cap, the plurality of clamping members clamp the center column, when the cover is located at a second angular position relative to the end cap, the plurality of clamping members do not clamp the center column, the cover is limited to rotate between the first angular position and the second angular position relative to the end cap, wherein as the cover rotates from the first angular position to the second angular position against the rotating direction, the plurality of clamping members is operative to move in a direction away from the center column to release their clamping on the center column, and as the cover rotates along the rotating direction from the first angular position, the cover is operative to drive the end cap and the clamping members to rotate along the rotating direction, and the ribs of the clamping members are operative to climb up along the thread.

5. The dust collector of claim 4, wherein the end cap is provided with a first blocking wall disposed at an end of the sliding slot, wherein as the cover rotates from the first angular position along the rotating direction, the protruding member pushes the first blocking wall thus driving the end cap and the clamping members to rotate along the rotating direction.

6. The dust collector of claim 4, wherein the end cap is provided with a plurality of the sliding slots, and is further provided with a plurality of first side walls disposed on a lower side of the end cap, and a plurality of the baffles each of which extends from the corresponding first side wall and is disposed on a lower side of the corresponding sliding slot, wherein each clamping member integrally extends from the corresponding first side wall, wherein the first side wall and the baffle separately form a wall of the corresponding sliding slot, the baffles are configured to abut at a lower side of the protruding members to prevent the cover from separating from the end cap downwards, and in the process that the ribs climb upwards along the thread, the baffles each push the corresponding protruding member upwards.

7. The dust collector of claim 1, wherein a projection of the baffle along a straight line parallel to an rotation axis of the cover is covered by a projection of the through opening along the straight line; the through opening is circular arc-shaped, and the extending member is parallel to a rotation axis of the cover; the through opening is provided with a first end and a second end that are opposite to each other in a rotating direction of the cover, and the extending member is limited to rotate between the first end and the second end as the cover is rotating relative to the end cap.

8. The dust collector of claim 1, wherein the extending member integrally extends from the protruding member.

9. The dust collector of claim 1, wherein the protruding member is provided with a first side and a second side that are opposite to each other, the baffle is configured to block at a first side of the protruding member to prevent the cover from separating from the end cap, and the extending member extends from the second side of the protruding member in a direction away from the baffle.

10. The dust collector of claim 1, wherein the end cap is further provided with an opening adjacent to an end of the baffle, and when mounting the cover on the end cap, the protruding member is operative to enter the sliding slot via the opening, and the extending member sequentially passes the opening and the sliding slot to enter the through opening; wherein the end cap is provided with a clamping member and a first side wall disposed on a radial inner side of the sliding slot, the baffle is connected to the first side wall, wherein the first side wall and the baffle each form a wall of the sliding slot, and in a process that the cover rotates relative to the end cap along a rotating direction, the cover pushes the clamping member to move towards a rotation axis of the cover; the clamping member extends from the first side wall.

11. The dust collector of claim 1, wherein the through opening is provided with a circular arc-shaped outer side edge, the extending member is disposed on a radial inner side of the outer side edge, and when the extending member is disposed at any position between the two opposite ends of the through opening, the extending member contacts the outer side edge or is operative to contact the outer side edge after moving outwards a first distance in a radial direction, the first distance being 0 mm-1.2 mm.

12. The dust collector of claim 11, wherein the through opening is further provided with a circular arc-shaped inner side edge opposite to the outer side edge in the radial direction, the extending member is disposed on a radial outer side of the inner side edge, and when the extending member is disposed at any position between the two opposite ends of the through opening, the extending member is operative to contact the inner side edge after moving inwards a second distance in the radial direction, the second distance being larger than the first distance.

13. The dust collector of claim 12, wherein the end cap is provided with a circular arc-shaped first side wall that is disposed on the radial inner side of the protruding member, the baffle is connected to the first side wall, the end cap is provided with a clamping member, wherein as the cover is rotating along a rotating direction relative to the end cap, the cover is operative to push the clamping member to move towards a rotation axis of the cover, and the clamping member extends from first side wall, wherein the inner side edge forms a part of an outer side surface of the first side wall.

14. The dust collector of claim 1, wherein the through opening is provided with a circular arc-shaped inner side edge, the extending member is disposed on a radial outer side of the inner side edge, and the extending member abuts on the inner side edge as the extending member is rotating along with the cover.

15. The dust collector of claim 1, wherein the end cap is provided with a plurality of the gliding groove and a plurality of the baffle, the cover is provided with a plurality of the extending member, the bottom plate is provided with a plurality of the through opening, each extending member extends into the corresponding opening, and a distance between each extending member and a rotation axis of the cover is the same.

16. The dust collector of claim 1, wherein the end cap is provided with a plurality of the gliding groove and a plurality of the baffle, the cover is provided with a plurality of the extending member, the bottom plate is provided with a plurality of the through openings, each extending member extends into the corresponding opening, and the extending members are evenly distributed at a circumference around a rotation axis of the cover.

17. The dust collector of claim 1, wherein the filter frame is provided with a center column, the cover is operative to rotate around the center column along and against a rotating direction, the end cap is provided with a plurality of clamping members, and the cover is operative to push the clamping members to move towards the center column to make the clamping member clamp the center column as the cover is rotating relative to the end cap along the rotating direction.

18. The dust collector of claim 17, wherein the cover is provided with a plurality of the protruding member and a plurality of the extending member, each extending member extends from the corresponding protruding member, the cover is further provided with a plurality of pushing members configured for pushing the clamping members, each pushing member is operative to push the corresponding clamping member to move towards the center column as the cover is rotating relative to the end cap along the rotating direction, the cover is provided with a cover and an annular peripheral wall integrally connected to an outer periphery of the cover, the pushing members each integrally extend from the cover, the protruding members each integrally extend from the peripheral wall, the end cap is provided with a through end hole, and the center column runs through the end hole to enter the cover.

19. The dust collector of claim 17, wherein the end cap is provided with a plurality of first side walls, each clamping member integrally extends from the corresponding first side wall, the bottom plate and the baffle are spaced from each other, and the first side walls are connected between the bottom plate and the baffle.

20. A filtering assembly, for use in a dust collector and comprising a cartridge filter, an end cap connected to and shielding an end of the cartridge filter, an end ring connected to another end of the cartridge filter, and a cover rotatable and maintained at an outer side of the end cap, wherein the end cap is provided with a through end hole, the cover is operative to rotate around a center column along and against a rotating direction, wherein the cover shields the end hole, the end cap is provided with a sliding slot, a clamping member and a bottom plate, wherein the cover is operative to push the clamping member to move towards an rotation axis of the cover as the cover is rotating relative to the end cap along the rotating direction, the cover is provided with a protruding member that is operative to rotate with the cover along the sliding slot, the bottom plate is provided with a through opening through the bottom plate, wherein the through opening communicates between the sliding slot and an inner space of the cartridge filter, the cover is further provided with an extending member extending into the through opening, wherein the through opening comprises a first end and a second end that are opposite along the rotating direction, and the extending member is limited to rotate between the first end and the second end as the cover is rotating relative to the end cap.

\* \* \* \* \*